(12) United States Patent
Shimoda et al.

(10) Patent No.: US 7,928,180 B2
(45) Date of Patent: Apr. 19, 2011

(54) BIODEGRADABLE POLYMER, PRODUCTION METHOD THEREOF, MOLDED PRODUCT THEREOF, AND USE THEREOF

(75) Inventors: Manabu Shimoda, Ichihara (JP); Tomoyuki Kawabata, Ichihara (JP); Tadahito Nobori, Yokohama (JP); Makoto Sukegawa, Chiba (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 442 days.

(21) Appl. No.: 11/988,008

(22) PCT Filed: Jun. 28, 2006

(86) PCT No.: PCT/JP2006/312857
§ 371 (c)(1),
(2), (4) Date: Dec. 28, 2007

(87) PCT Pub. No.: WO2007/004478
PCT Pub. Date: Jan. 11, 2007

(65) Prior Publication Data
US 2009/0142982 A1 Jun. 4, 2009

(30) Foreign Application Priority Data
Jun. 30, 2005 (JP) .................. 2005-191203

(51) Int. Cl.
*C08G 18/08* (2006.01)
*C08G 18/28* (2006.01)
*C08G 63/685* (2006.01)

(52) U.S. Cl. .......................... 528/81; 528/363
(58) Field of Classification Search .......... 524/590, 524/606; 528/61, 363
See application file for complete search history.

(56) References Cited

U.S. PATENT DOCUMENTS

| 4,038,223 A * | 7/1977 | Pohjola et al. ............. 527/301 |
| 4,900,299 A | 2/1990 | Webb |
| 5,968,222 A * | 10/1999 | Kodali .................. 71/64.07 |
| 7,037,992 B2 * | 5/2006 | Wilson et al. ............. 526/274 |
| 2003/0236371 A1 * | 12/2003 | Wilson et al. ............. 526/266 |
| 2004/0013728 A1 * | 1/2004 | Oh et al. ................ 424/468 |

FOREIGN PATENT DOCUMENTS

| EP | 0142950 B1 | 10/1990 |
| JP | S63-302845 A | 12/1988 |
| JP | H05-029211 A | 2/1993 |
| JP | H06-134910 A | 5/1994 |
| JP | H06-299077 A | 10/1994 |
| JP | 06-306298 A | 11/1994 |
| JP | H07-057230 A | 3/1995 |
| JP | 2002-526383 A | 8/2002 |
| JP | 2003-073470 A | 3/2003 |
| WO | WO 99/59548 A1 | 11/1999 |
| WO | WO-2004/003044 A2 | 1/2004 |
| WO | WO 2004/083266 A1 | 9/2004 |

OTHER PUBLICATIONS

Magnani et al., "Novel Polysaccharide Hydrogels: Characterization and Properties", Polym. Adv. Technol. 11, 488-495, 2000.*
Barbucci et al., "Polysaccharides Based Hydrogels for Biological Applications", Macromol. Symp. 204, 37-58, 2003.*
G.F. D'Alelio et al., "Polymeric Schiff Bases. I. The Synthesis and Evaluation of Polymeric Schiff Bases Prepared by Schiff Base Exchange Reactions", Journal of Macromolecular Science-Chemistry, Nov. 1967, pp. 1161-1249, vol. A1-No. 7, Marcel Dekker, Inc., USA.
Takashi Ono et al., "Dynamic polymer blends-component recombination between neat dynamic covalent polymers at room temperature", Chemical Communications, Mar. 28, 2005, pp. 1522-1524, No. 12, ISSN 1359-7345.

* cited by examiner

*Primary Examiner* — Tae H Yoon
(74) *Attorney, Agent, or Firm* — Buchanan Ingersoll & Rooney PC

(57) ABSTRACT

The problem of the invention is to provide a novel biodegradable polymer without water solubility (hygroscopicity), but with moldability and excellent water disintegratability and biodegradability, a production method thereof, a molded product thereof and applications thereof. The biodegradable polymer of the invention is a biodegradable polymer having one or more imine bonds within a molecule, characterized in that the imine bond constitutes part of a main chain structure of the biodegradable polymer. The biodegradable polymer preferably comprises a biodegradable unit and an imine unit having one or more imine bonds and has a chemical structure, in which the biodegradable units are linked by the imine unit.

2 Claims, 1 Drawing Sheet

BIODEGRADABLE POLYMER, PRODUCTION METHOD THEREOF, MOLDED PRODUCT THEREOF, AND USE THEREOF

TECHNICAL FIELD

The present invention relates to a novel biodegradable polymer. In more detail, it relates to a water disintegrating biodegradable polymer with a feature allowing stable use without decomposing on contact with moisture in the air or a small amount of water, but disintegrating its shape on contact with a large amount of water, a production method thereof, a molded product thereof and use thereof.

BACKGROUND ART

Currently thermoplastic resins such as polyethylene (abbreviated as "PE" hereinafter), polypropylene (abbreviated as "PP" hereinafter), and the like, absorbent cotton and paper are generally used as a raw material for sanitary goods such as sanitary tampons, napkins, liners and disposable diapers, and the like. Thermoplastic resins such as PE, PP, and the like among them are widely used because of moldability with high flexibility.

However, molded products using such resins as a raw material do not easily disintegrate their shape on contact with water so that they cannot be flushed into a toilet bowl after use. This is because these molded products cause clogging of a toilet piping and a sewage disposal system when they are flushed in a toilet bowl. Therefore, a user could be constrained to experience such inconveniences as disposing the used sanitary goods in a trash being provided in a toilet or taking them home to dispose when away from home because of anxiety and concern with treatment afterward at outside or visiting location. Thus, it is more hygienic and more convenient if the sanitary goods mentioned above, particularly menstrual sanitary products and disposable diapers can be disposed as an effluent after use similarly to toilet paper, and the like.

With such a background, development of a (water disintegrating) material has been strongly desired, which as a raw material for sanitary goods, does not disintegrate with body fluid when used, but disintegrates on contact with a large amount of water when disposed into a toilet bowl, and the like after use.

Increase of environmental load is generally pointed out when a polymer material without biodegradability is disposed or discharged into nature. Therefore, a biodegradable raw material is preferred as a material discharged into a toilet bowl, and the like from a viewpoint of lowering environmental load and its development has been desired.

Furthermore, paper used as sanitary goods conventionally has such advantages as high water absorptivity and capability to be discharged into a toilet bowl because of a natural raw material, but the sense of touch such as texture and appearance are poor because it lacks moldability with high flexibility as the thermoplastic resins. It is therefore not suitable to use as a surface material of the sanitary goods, in which importance with the sense of touch and appearance is stressed. Accordingly, in order to improve the sense of touch and appearance of a raw material for the sanitary goods and the like, moldability is also required for the raw material.

From the above, creation of a raw material satisfying the following three features is desired for a raw material used in the sanitary goods.
1. Good stability and no deterioration in strength against moisture in the air or a small amount of water, but good water disintegratability with easy disintegration of its shape on contact with a large amount of water, particularly contact under a neutral condition.
2. Biodegradability without environmental load on the earth.
3. Moldability to maintain good sense of touch such as texture and good appearance.

Poly(3-hydroxylactic acid) is disclosed in Patent Document 1 as a method to solve the problems above. In this disclosure, a biodegradable thermoplastic resin is used to solve the problems with biodegradability and moldability, but fails to solve the problems with the water disintegratability because poly(3-hydroxylactic acid) lacks water disintegratability.

Patent Document 2 discloses as an example that improved this problem a method to disintegrate poly(3-hydroxylactic acid) with water under a basic condition. This method hydrolyzes the ester bond under a strong basic condition (equal to pH 12 or higher) to disintegrate with water. However, a reaction rate of the ester bond hydrolysis is too slow to fully disintegrate with water, resulting in inadequate solution of the problems with water disintegratability.

Patent Document 3 also discloses an acrylic polymer with a carboxyl group, which demonstrates water disintegratability under weak basic condition (pH 10) as an example that water disintegratability was improved under basic condition. This acrylic polymer with the carboxyl group demonstrates water resistance under neutral condition and water disintegratability by adding a base to water in a toilet bowl, and the like, to adjust to weakly basic, but lacks biodegradability, so that there is still a problem with environmental load.

Next, as an example of a water disintegrative polymer under neutral condition, Patent Documents 4 and 5 in which water soluble resin such as polyvinyl alcohol or polyethylene glycol, and the like were used are published. However, in these examples, there are such problems in use, as the material absorbs moisture with time to get moist before use, causing stickiness on surface or generation of mildew because a water soluble resin is contained in the material.

Patent Document 6 also discloses a biodegradable resin composition obtained by mixing 20 to 80% by weight of a biodegradable plastic and 80 to 20% by weight of a water soluble thermoplastic resin. This biodegradable resin composition comprises a water soluble thermoplastic resin, which is dissolved in or swollen with water to break or potentially disintegrate a shape of a molded product of the biodegradable resin composition, but cannot provide sufficient water disintegratability because the biodegradable plastic itself used lacks the water disintegratability. It has such problems in use as the material absorbs moisture with time to get moist before use, causing stickiness on surface or generation of mildew because of use of a water soluble thermoplastic resin in the material.

In addition to the above, a method to utilize a chemical bond such as an imide or acetal bond, and the like, which is chemically readily hydrolyzed may be considered as an approach to improve the water disintegratability, but a material satisfying three required features described above has not been thus far found.

For example, polyphenyl azomethine having high heat resistance and demonstrating facile degradability only in acidic aqueous solution or a polymer with a cyclic imine structure demonstrating no degradability in a neutral aqueous solution are known as a polymer having the imine bond (also called as azomethine bond) (Patent Document 7).

Various azomethine polymers are further disclosed in Patent Document 8 and Non-patent Documents 1 and 2. These documents do not particularly refer to degradability with water, but all of the azomethine polymers disclosed do not have biodegradability. A polymer with the acetal bond also includes polyoxymethylene, which is one of typical engineering plastics. This polymer has excellent heat resistance, water resistance and durability, which are not predicted from the unstable chemical structure of the acetal bond that constitutes the polymer and is used as a raw material for a plastic water pipe.

Even in a polymer constituted by a chemical bond with facile chemical hydrolyzability, the water disintegratability is very difficult to predict or discuss. A practical material with both water disintegratability and biodegradability together which does not disintegrate in common use, but disintegrates on contact with a large amount of water is not known.

Patent Document 1: Japanese Patent Laid-open Publication No. S63-302845
Patent Document 2: European Patent No. 0142950
Patent Document 3: Japanese Patent Laid-open Publication No. H7-57230
Patent Document 4: Japanese Patent Laid-open Publication No. H5-29211
Patent Document 5: Japanese Patent Laid-open Publication No. H6-134910
Patent Document 6: Japanese Patent Laid-open Publication No. H6-299077
Patent Document 7: Japanese Patent Laid-open Publication No. 2003-73470
Patent Document 8: WO 2004/003044
Non-patent Document 1: J. Macromol. Sci., Chem., A1 (7), 1161-1249 (1967)
Non-patent Document 2: Chem. Commun., 1522-1524 (2005)

DISCLOSURE OF THE INVENTION

Problem to be Solved by the Invention

The following four conditions can be listed for a material used in sanitary hygiene goods.
1. Having no water solubility (hygroscopicity) to cause absorption of moisture in air during storage to become sticky.
2. Having capability to be used just the same as usual without disintegration with body fluid in use, and having water disintegratability in which the shape is disintegrated after discharged in a toilet bowl to contact with a large amount of water.
3. Having biodegradability to be decomposed by microorganisms, and the like, after discharged and treated in a toilet bowl and the like, thus minimizing an effect on natural environment.
4. Having moldability to maintain good sense of touch such as texture or good appearance.

There is no conventional art to satisfy the four objects above required for a material of the sanitary hygiene goods, and the like.

Accordingly, an object of the present invention is to provide a novel biodegradable polymer without water solubility (hygroscopicity), but capable of molding and excellent with water disintegratability and biodegradability, a production method thereof, molded product thereof and use thereof.

Means for Solving the Problems

The present inventors earnestly studied to achieve the objects described above. As a result, they found that a polymer material comprising both an imine unit having a particular imine bond and a particular biodegradable unit together does not have water solubility (hygroscopicity) such as stickiness or shape disintegration in ordinary condition, initiates facile disintegration of its shape only on contact with a large amount of water and disintegrates its shape faster when contacting with acidic water. Furthermore, they surprisingly found improvement of biodegradability to complete the present invention.

That is, the present invention provides (1) to (19) as follows.

[1] A biodegradable polymer having one or more imine bonds within a molecule, wherein the imine bond constitutes part of a main chain structure of the biodegradable polymer.

[2] The biodegradable polymer according to [1], wherein the biodegradable polymer comprises a biodegradable unit and an imine unit having one or more imine bonds and has a chemical structure in a form in which the biodegradable units are linked via the imine unit.

[3] The biodegradable polymer according to [2], wherein the biodegradable unit is a polyester, an oligoester, a poly(amide-ester), an oligo(amide-ester) or a polyether.

[4] The biodegradable polymer according to [2], wherein the imine unit is an imine unit represented by the general formula (1) below.

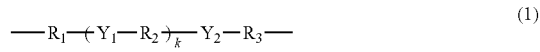

In the formula, $R_1$ to $R_3$ each independently represent a hydrocarbon group having 1 to 20 carbon atoms, $Y_1$ and $Y_2$ each independently represent —CR=N— or —N=CR—, R represents a hydrogen atom or an aliphatic hydrocarbon group having 1 to 20 carbon atoms and k represents an integer of 0 to 1000.

[5] The biodegradable polymer according to [2], wherein the chemical bond linking the biodegradable unit with the imine unit is an ester, amide, urethane, urea or carbonate bond or a bond represented by the general formula (2) below.

In the formula, R' represents a divalent hydrocarbon group having 1 to 20 carbon atoms, $X_1$ and $X_2$ each independently represent an ester, amide, urethane, urea or a carbonate bond.

[6] The biodegradable polymer according to [2], wherein the biodegradable unit is a polyester, an oligoester, a poly(amide-ester), an oligo(amide-ester) or a polyether, the imine unit is an imine unit represented by general formula (1) described in [4] and the chemical bond to link the biodegradable units with the imine unit is an ester, amide, urethane, urea or a carbonate bond or a bond represented by the general formula (2) described in [5].

[7] A production method of a biodegradable polymer, wherein a compound comprising a biodegradable unit, a compound comprising an imine unit having one or more imine bonds and a condensation agent are allowed to react.

[8] The production method of the biodegradable polymer according to [7], wherein the condensing agent is 2-chloro-1-methylpyridinium iodide, 2-bromo-1-methylpyridinium iodide, 2-chloro-1-ethylpyridinium tetrafluoroborate or 2-bromo-1-ethylpyridinium tetrafluoroborate.

[9] A production method of a biodegradable polymer, wherein a compound comprising a biodegradable unit, a compound comprising an imine unit having one or more imine bonds and a condensation agent are allowed to react.

[10] The production method of the biodegradable polymer according to [9], wherein the linking agent is a diisocyanate or carbonate ester.

[11] A molded product of the biodegradable polymer, comprising the biodegradable polymer according to any of [1] to [6].

[12] The molded product of the biodegradable polymer according to [11], wherein the molded product contains an inorganic additive.

[13] The molded product of the biodegradable polymer according to [11], wherein the molded product is a sheet, film, vessel or nonwoven fabric.

[14] Sanitary goods comprising the biodegradable polymer according to any one of [1] to [6].

[15] The sanitary goods according to [14], wherein the sanitary goods is at least one kind selected from a sanitary napkin, a panty liner, a disposable diaper or a sanitary tampon applicator.

[16] An agricultural and horticultural material comprising the biodegradable polymer according to any of [1] to [6].

[17] The agricultural and horticultural material according to [16], wherein the agricultural and horticultural material is at least one kind selected from a mulch film, raising pot for seedling, horticultural tape, fruit growing bag, picket, fumigation sheet or film for a plastic greenhouse.

[18] A civil engineering and construction material comprising the biodegradable polymer according to any of [1] to [6].

[19] The civil engineering and construction material according to [18], wherein the civil engineering and construction material is at least one kind selected from a vegetation net, vegetation pot, three dimensional net, fabric for civil engineering, picket or heat insulation material.

EFFECT OF THE INVENTION

A novel biodegradable polymer provided by the present invention demonstrates excellent water disintegratability and biodegradability. Since the biodegradable polymer of the present invention does not have water solubility (hygroscopicity), a molded product thereof neither deteriorate in a surface state with moisture in the air or body fluid nor disintegrate its shape. Therefore, a molded product obtained from the biodegradable polymer of the present invention has no problem at all in storage and in use and may be discharged into a toilet bowl or kitchen sink after use to disintegrate its shape only when contacting with a large amount of water. This water disintegratability is further realized in a neutral condition (about pH 7). After discharged and treated, the biodegradable polymer is biodegraded by a microorganism, and the like, in a sewage disposal treatment process or in nature to prevent a natural environment from contamination. Since the biodegradable polymer of the present invention has excellent moldability, a molded product with good appearance and good sense of touch such as texture can be obtained.

BEST MODE FOR CARRYING OUT THE INVENTION

Figure 1:
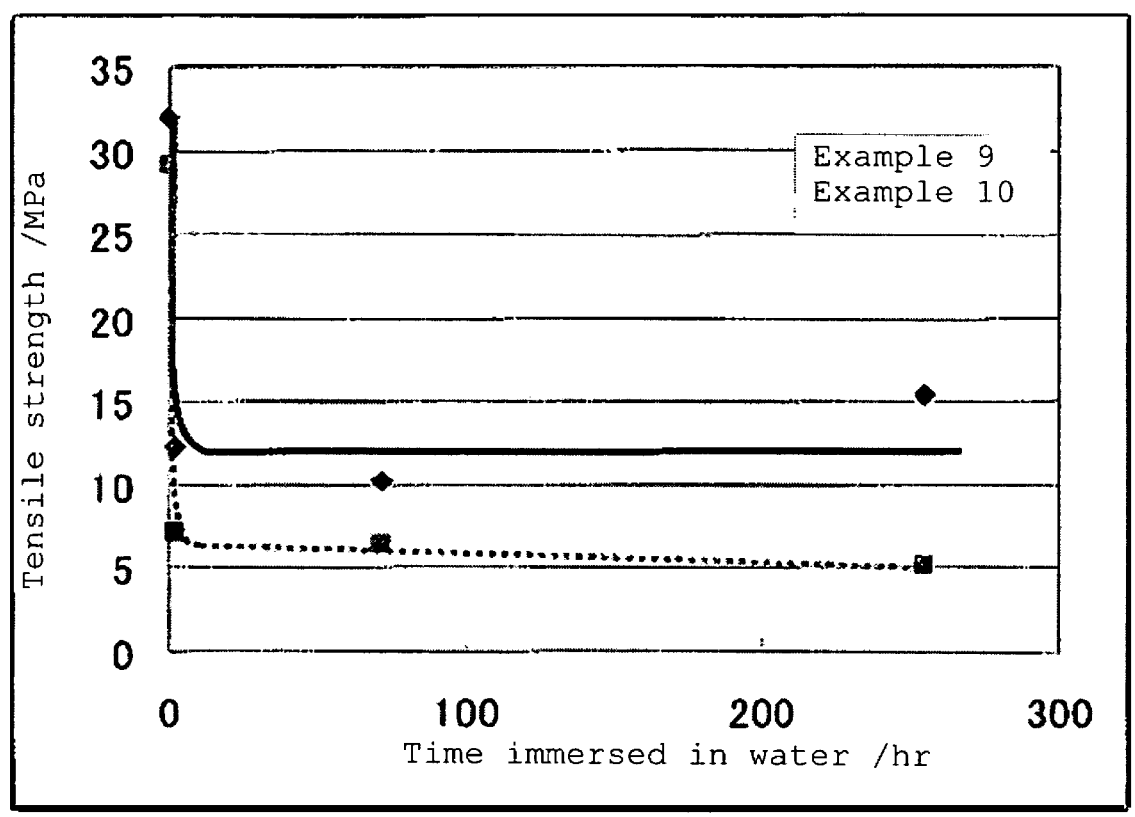
FIG. 1 is a graph to demonstrate the results of measurement of tensile strength variation with time after immersion of a film comprising a biodegradable polymer in water carried out in Examples 9 and 10.

Water disintegratability in the invention refers to the property that the shape is disintegrated on contact with a large amount of water. More preferably, it refers to the property that a film with a 11 cm square is disintegrated into one with a 4 cm square or less after immersion in distilled water (about pH 7) for 520 hours or less according to a test on defiberizability of "toilet tissue papers" in JIS P 4501. Biodegradability in the invention also refers to the property that a polymer molecule is decomposed by a microorganism and the like to a low molecular compound in a sewage disposal treatment process or in nature to further degrade to carbon dioxide and water. More preferably it refers to the property that a film has a degree of biodegradation of 60% or more in a biodegradable test according to ISO 14855.

[Biodegradable Polymer]

A biodegradable polymer according to the invention is a biodegradable polymer having one or more imine bonds within a molecule, in which said imine bond forms part of the main chain structure in said biodegradable polymer. Preferably, it contains at least a biodegradable unit having biodegradability and an imine unit having one or more imine bonds. More preferably, it has a chemical structure in a form in which the biodegradable units described above are linked by the imine unit described above. The biodegradable unit described above comprises a low molecular compound, oligomer or polymer having biodegradability, whereas the imine unit described above comprises a low molecular compound, oligomer or polymer having one or more imine bonds.

<Biodegradable Unit>

The biodegradable unit described above may have any chemical structure so far as it does not interfere with an objective of the invention and is derived from a biodegradable molecule, and may be either one of a low molecular compound, oligomer or polymer. A molecule constituting such biodegradable unit includes, for example, low molecular compounds, polyesters, oligoesters, polyamides, oligoamides, poly(amide-esters), oligo(amide-esters), polypeptides, oligopeptides, polyethers or oligoethers, and the like. These may be used in one kind singly or two kinds or more in combination as the biodegradable unit in the biodegradable polymer of the invention.

A low molecular compound constituting the biodegradable unit described above includes a compound having 1 to 100 carbon atoms, preferably 2 to 50 carbon atoms with two or more functional groups such as hydroxyl, amino or carboxyl groups, and the like within a molecule, for example, divalent aliphatic alcohols, dibasic acids, hydroxycarboxylic acids, divalent aliphatic amines, amino acids, and the like. A low molecular compound constituting such a biodegradable unit includes, for example, divalent aliphatic alcohols such as ethylene glycol, diethylene glycol, triethylene glycol, tetraethylene glycol, propylene glycol, dipropylene glycol, 1,3-propanediol, 1,3-butanediol, 1,4-butanediol, 3-methyl-1,5-pentanediol, 1,6-hexanediol, 1,9-nonanediol, neopentyl glycol and 1,4-cyclohexanediol, dibasic acids such as succinic acid, malonic acid, glutaric acid, adipic acid, pimelic acid, suberic acid, azelaic acid, sebacic acid, undecane diacid, dodecane diacid and terephthalic acid, hydroxycarboxylic acids such as glycolic acid, lactic acid, 2-hydroxybutyric acid, 2-hyroxyvaleric acid, 2-hydroxycaproic acid, 2-hydroxycapric acid, malic acid and citric acid, divalent aliphatic amines such as ethylenediamine, 1,3-diaminopropane, 1,2-diaminopropane, 1,4-diaminobutane, 1,6-hexamethylenediamine, 2,2'-(ethylenedioxy)bis(ethylamine), 3,3'-iminobis(propylamine) and N-methyl-3,3'-iminobis(propylamine), and amino acids such as valine, leucine, isoleucine, methionine, phenylalanine, asparatic acid, glutamic acid and lysine.

Polyesters or oligoesters constituting the biodegradable unit described above include, for example, those having a chemical structure in a form to be produced in a dehydration reaction between divalent aliphatic alcohols and dibasic acids.

Divalent aliphatic alcohols described above include, for example, ethylene glycol, diethylene glycol, triethylene glycol, tetraethylene glycol, oligoethylene glycol, polyethylene glycol, propylene glycol, dipropylene glycol, oligopropylene glycol, polypropylene glycol, 1,3-propanediol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanediol, and the like. Dibasic acids described above include, for example, succinic acid, oxalic acid, malonic acid, glutaric acid, adipic acid, pimelic acid, suberic acid, azelaic acid, sebacic acid, undecane diacid, dodecane diacid, terephthalic acid, and the like. These constituent monomers may be used in one kind singly or two kinds or more in combination.

Polyesters or oligoesters described above also include those having a chemical structure in a form to be produced by a dehydration reaction of hydroxycarboxylic acids or those having a chemical structure in a form to be produced by a ring-opening polymerization reaction of lactones.

Hydroxycarboxylic acids described above include, for example, glycolic acid, lactic acid, 2-hydroxybutyric acid, 2-hydroxyvaleric acid, 2-hydroxycaproic acid, 2-hydroxycapric acid, malic acid, citric acid, and the like. Lactones described above include, for example, benzyl malolactonate, malite benzyl ester, 3-[(benzyloxycarbonyl)methyl]-1,4-dioxane-2,5-dione, β-propiolactone, δ-valerolactone, ε-caprolactone, N-benzyloxycarbonyl-L-serine-β-lactone, β-butyrolactone, pivalolactone, β-benzyl malolactonate, γ-butyrolactone, γ-valerolactone, and the like. These constituent monomers may be used in one kind singly or two kinds or more in combination.

Polyesters or oligoesters described above further include those having a chemical structure in a form to be produced by a dehydration reaction using one kind or more of each of dibasic acids described above, divalent aliphatic alcohols described above and hydroxycarboxylic acids described above.

Polyamides or oligoamides constituting the biodegradable unit described above include those having a chemical structure in a form to be produced by a dehydration reaction of divalent aliphatic amines with dibasic acids.

Divalent aliphatic amines described above include, for example, ethylenediamine, 1,3-diaminopropane, 1,2-diaminopropane, 1,4-diaminobutane, 1,6-hexamethylenediamine, 2,2'-(ethylenedioxy)bis(ethylamine), 3,3'-iminobis(propylamine), N-methyl-3,3'-iminobis(propylamine), and the like. Dibasic acids described above include, for example, succinic acid, oxalic acid, malonic acid, glutaric acid, adipic acid, pimelic acid, suberic acid, azelaic acid, sebacic acid, undecane diacid, dodecane diacid, terephthalic acid, and the like. These constituent monomers may be used in one kind singly or two kinds or more in combination.

Polyamides or oligoamides described above include, for example, those having a chemical structure in a form to be produced by a ring-opening polymerization reaction of lactams such as pyrrolidone, ε-caprolactam, and the like. These constituent monomers may be used in one kind singly or two kinds or more in combination.

Poly(amide-esters) or oligo(amide-esters) constituting the biodegradable unit described above include those having a chemical structure in a form to be produced by a dehydration reaction of dibasic acids with divalent aliphatic amines and divalent aliphatic alcohols.

Dibasic acids described above include, for example, succinic acid, oxalic acid, malonic acid, glutaric acid, adipic acid, pimelic acid, suberic acid, azelaic acid, sebacic acid, undecane diacid, dodecane diacid, terephthalic acid, and the like. Divalent aliphatic amines described above include, for example, ethylenediamine, 1,3-diaminopropane, 1,2-diaminopropane, 1,4-diaminobutane, 1,6-hexamethylenediamine, 2,2'-(ethylenedioxy)bis(ethylamine), 3,3'-iminobis(propylamine), N-methyl-3,3'-iminobis(propylamine), and the like. Divalent aliphatic alcohols described above include, for example, ethylene glycol, diethylene glycol, triethylene glycol, tetraethylene glycol, oligoethylene glycol, polyethylene glycol, propylene glycol, dipropylene glycol, oligopropylene glycol, polypropylene glycol, 1,3-propanediol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanediol, and the like. These constituent monomers may be used in one kind singly or two kinds or more in combination.

Poly(amide-esters) or oligo(amide-esters) above include, for example, those having a chemical structure in a form to be produced by a ring-opening polymerization reaction of lactams and lactones.

Lactams described above include, for example, pyrrolidone, ε-caprolactam, and the like. Lactones described above include, for example, benzyl malolactonate, malite benzyl ester, 3-[(benzyloxycarbonyl)methyl]-1,4-dioxane-2,5-dione, β-propiolactone, δ-valerolactone, ε-caprolactone, N-benzyloxycarbonyl-L-serine-β-lactone, β-butyrolactone, pivalolactone, β-benzyl malolactonate, γ-butyrolactone, γ-valerolactone, and the like. These constituent monomers may be used in one kind singly or two kinds or more in combination.

Poly(amide-esters) or oligo(amide-esters) described above include those having a chemical structure in a form to be produced by a ring-opening polymerization reaction of depsipeptides such as morpholine-2,5-dione, and the like. These constituent monomers may be used in one kind singly or two kinds or more in combination.

Polypeptides or oligopeptides constituting the biodegradable unit described above include those having a chemical structure in a form to be produced by a dehydration reaction of amino acids, for example, alanine, valine, leucine, isoleucine, methionine, phenylalanine, glycine, asparatic acid, glutamic acid, lysine, and the like. These constituent monomers may be used in one kind singly or two kinds or more in combination.

Polyethers or oligoethers constituting the biodegradable unit described above include, for example, polyethers such as polyethylene glycol, polypropylene glycol, and the like or oligoethers such as oligoethylene glycol or oligopropylene glycol, and the like.

The biodegradable unit described above are, from a viewpoint of improving biodegradability and mechanical properties of a molded product, preferably polyesters, oligoesters, poly(amide-esters), oligo(amide-esters) or polyethers, more preferably polyesters, oligoesters, poly(amide-esters) or oligo(amide-esters), further more preferably polyesters or oligoesters. Polyesters or oligoesters comprising one kind or more of $C_1$-$C_{48}$ divalent alcohols and one kind or more of $C_2$-$C_{10}$ dibasic acids, or polyesters or oligoesters comprising one kind or more of $C_2$-$C_{10}$ hydroxycarboxylic acids are particularly preferred.

The molecular weight of the biodegradable unit described above is preferably in a range of 100 to 100,000, more preferably 400 to 30,000, further more preferably 1,000 to 10,000 in order to improve the water disintegratability and biodegradability.

<Imine Unit>

The imine unit constituting the biodegradable polymer of the invention may have any chemical structure so far as it does not interfere with an objective of the invention and has one or more imine bonds within a molecule, and may be either one of a low molecular compound, oligomer or polymer. A molecule constituting such an imine unit is not particularly limited in its structure, but includes, for example, an organic group represented by the general formula (1) or the general formula (1') below. These groups may be used as the imine unit in the biodegradable polymer of the invention in one kind singly or two kinds or more in combination.

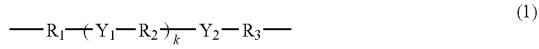  (1)

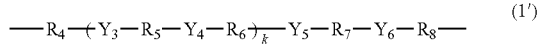  (1')

In the above formulas (1) and (1'), $R_1$ to $R_8$ each independently represent a hydrocarbon group having 1 to 20 carbon atoms, $Y_1$ to $Y_6$ each independently represent —CR=N— or —N=CR—, R represents a hydrogen atom or an aliphatic hydrocarbon group having 1 to 20 carbon atoms and k represents an integer of 0 to 1000. Formula (1) is preferred among the above formulas (1) and (1').

$R_1$ to $R_8$ in the above formulas (1) and (1') represent a group constituting the imino unit and may be a group with any chemical structure so far as it does not interfere with an objective of the invention. A $C_1$-$C_{20}$ hydrocarbon group represented by $R_1$ to $R_8$ includes an aliphatic hydrocarbon group, an alicyclic hydrocarbon group and an aromatic hydrocarbon group, more specifically same kinds or different kinds of a $C_1$-$C_{20}$ aliphatic hydrocarbon group, $C_1$-$C_{20}$ aliphatic hydrocarbon group having one or more ester bonds, $C_1$-$C_{20}$ aliphatic hydrocarbon group having one or more ether bonds, $C_1$-$C_{20}$ aliphatic hydrocarbon group having one or more amide bonds, $C_3$-$C_{20}$ alicyclic hydrocarbon group, $C_6$-$C_{20}$ aromatic hydrocarbon group, $C_7$-$C_{20}$ aliphatic hydrocarbon group having the aromatic hydrocarbon group, or the like. These organic groups may further have any substituent so far as they do not interfere with an objective of the present invention.

Among them, a $C_1$-$C_{20}$ aliphatic hydrocarbon group, $C_1$-$C_{20}$ aliphatic hydrocarbon group having one or more ester bonds, $C_1$-$C_{20}$ aliphatic hydrocarbon group having one or more ether bonds, $C_3$-$C_{20}$ alicyclic hydrocarbon group and $C_6$-$C_{20}$ aromatic hydrocarbon group are preferred and a $C_1$-$C_{20}$ aliphatic hydrocarbon group, $C_1$-$C_{20}$ aliphatic hydrocarbon group having one or more ether bonds and $C_6$-$C_{20}$ aromatic hydrocarbon group are more preferred.

$Y_1$ to $Y_6$ in the above formulas (1) and (1') each independently represent —CR=N— or —N=CR— and may be the same or different. In the above formula (1), it is preferred that both $Y_1$ and $Y_2$ are —N=CR— or —CR=N— simultaneously, $Y_1$ is —CR=N— and $Y_2$ is —N=CR— or $Y_1$ is —N=CR— and $Y_2$ is —CR=N—. In the above formula (1'), it is preferred that both $Y_3$ and $Y_5$ are —N=CR— simultaneously and both $Y_4$ and $Y_6$ are —CR=N— simultaneously or both $Y_3$ and $Y_5$ are —CR=N— simultaneously and both $Y_4$ and $Y_6$ are —N=CR— simultaneously.

R each in $Y_1$-$Y_6$ described above may be the same or different and represents a hydrogen atom or $C_1$-$C_{20}$ aliphatic hydrocarbon group. From a viewpoint of water disintegratability of the biodegradable polymer, it is preferably a hydrogen atom or $C_1$-$C_{15}$ aliphatic hydrocarbon group, more preferably a hydrogen atom or $C_1$-$C_{10}$ aliphatic hydrocarbon group, particularly preferably a hydrogen atom or $C_1$-$C_5$ aliphatic hydrocarbon group.

k in the above formulas (1) and (1') represents an integer of 0 to 1,000 and is preferably in a range of 0 to 100, more preferably in a range of 0 to 50, further more preferably in a range of 0 to 20.

The molecular weight of the imine unit described above is not particularly limited, but preferably 50,000 or less, more preferably 10,000 or less, further more preferably 2,000 or less in order to exert excellent water disintegratability and biodegradability.

<Linking Unit>

A liking unit to link the biodegradable unit described above with the imine unit described above may have any chemical structure so far as it does not interfere with an objective of the invention. A chemical bond capable of such linking includes, for example, an ester bond, an amide bond, a urethane bond, a urea bond, a carbonate bond and a bond represented by the following general formula (2) (optionally referred to as "bond (2)" hereinafter), and the like.

  (2)

In the formula (2), R' represents a divalent $C_1$-$C_{20}$ hydrocarbon group and $X_1$ and $X_2$ each independently represent an ester, amide, urethane, urea or carbonate bond.

A divalent $C_1$-$C_{20}$ hydrocarbon group represented by R' includes an aliphatic hydrocarbon group, alicyclic hydrocarbon group and aromatic hydrocarbon group, more specifically a divalent $C_1$-$C_{20}$ aliphatic hydrocarbon group, divalent $C_1$-$C_{20}$ aliphatic hydrocarbon group having one or more ether bonds, divalent $C_1$-$C_{20}$ aliphatic hydrocarbon group having one or more ester bonds, divalent $C_1$-$C_{20}$ aliphatic hydrocarbon group having one or more amide bonds, divalent $C_3$-$C_{20}$ alicyclic hydrocarbon group, divalent $C_6$-$C_{20}$ aromatic hydrocarbon group, divalent $C_7$-$C_{20}$ aliphatic hydrocarbon group having the aromatic hydrocarbon group, and the like.

Among them, from a viewpoint of improving the biodegradability and water disintegratability, a divalent $C_1$-$C_{20}$ aliphatic hydrocarbon group, divalent $C_1$-$C_{20}$ aliphatic hydrocarbon group having one or more ether bonds, divalent $C_1$-$C_{20}$ aliphatic hydrocarbon group having one or more ester bonds or divalent $C_6$-$C_{20}$ aromatic hydrocarbon group are preferred, a divalent $C_1$-$C_{20}$ aliphatic hydrocarbon group, divalent $C_1$-$C_{20}$ aliphatic hydrocarbon group having one or more ether bonds or divalent $C_1$-$C_{20}$ aliphatic hydrocarbon group having one or more ester bonds are more preferred and divalent $C_1$-$C_{20}$ aliphatic hydrocarbon group or divalent $C_1$-$C_{20}$ aliphatic hydrocarbon group having one or more ether bonds are further more preferred.

$X_1$ and $X_2$ represent an ester, amide, urethane, urea or carbonate bond and may be the same or different. Among them, from a viewpoint of improving the biodegradability and water disintegratability, an ester, urethane, urea or carbonate bond is preferred, an ester, urethane or carbonate bond is more preferred and an ester or urethane bond is further more preferred.

A chemical bond used as the linking unit described above to link the biodegradable unit with the imine unit may be used in one kind singly or two kinds or more in combination. From a viewpoint of improving the biodegradability and water disintegratability, an ester, urethane or carbonate bond or bond (2) is preferred, an ester or urethane bond or bond (2) is more preferred and an ester bond or bond (2) is further more preferred as a chemical bond used as a linking unit.

As described above, the biodegradable polymer of the invention has a chemical structure in a form in which the biodegradable unit is linked with the imine unit and a ratio of the biodegradable unit to the imine unit is preferably in a range of 1:9 to 9:1, more preferably in a range of 1:7 to 7:1, further more preferably in a range of 1:5 to 5:1, particularly preferably in a range of 1:3 to 3:1.

In a preferred biodegradable polymer of the invention, the biodegradable unit is polyester, oligoester, poly(amide-ester), oligo(amide-ester) or polyether, the imine unit is a unit represented by the above formula (1) and the chemical bond linking the biodegradable unit with the imine unit is an ester, amide, urethane, urea or carbonate bond or bond (2).

In a more preferred biodegradable polymer of the invention, the biodegradable unit is polyester, oligoester, poly(amide-ester) or oligo(amide-ester), the imine unit is a unit represented by the above formula (1) and the chemical bond linking the biodegradable unit with the imine unit is an ester, amide, urethane, urea or carbonate bond or bond (2).

In a particularly preferred biodegradable polymer of the invention, the biodegradable unit is polyester, oligoester, poly (amide-ester) or oligo (amide-ester), the imine unit is the imine unit of the formula (1) in which $R_1$ to $R_3$ is a $C_1$-$C_{20}$ aliphatic hydrocarbon group, $C_1$-$C_{20}$ aliphatic hydrocarbon group having one or more ester bonds, $C_1$-$C_{20}$ aliphatic hydrocarbon group having one or more ether bonds, $C_3$-$C_{20}$ alicyclic hydrocarbon group or $C_6$-$C_{20}$ aromatic hydrocarbon group and $Y_1$ and $Y_2$ each are independently —N=CR— or —CR=N—, and the chemical bond linking the biodegradable unit with the imine unit is an ester, amide, urethane or carbonate bond or bond (2).

In a most preferred biodegradable polymer of the invention, the biodegradable unit is polyester, oligoester, poly (amide-ester) or oligo (amide-ester), the imine unit is the imine unit of the formula (1), in which $R_1$ to $R_3$ is a $C_1$-$C_{20}$ aliphatic hydrocarbon group, $C_1$-$C_{20}$ aliphatic hydrocarbon group having one or more ester bonds, $C_1$-$C_{20}$ aliphatic hydrocarbon group having one or more ether bonds or $C_6$-$C_{20}$ aromatic hydrocarbon group, $Y_1$ and $Y_2$ each are independently —N=CR— or —CR=N— and R is a hydrogen atom or $C_1$-$C_5$ aliphatic hydrocarbon group, and the chemical bond linking the biodegradable unit with the imine unit is an ester, urethane or carbonate bond or bond (2).

The molecular weight of the biodegradable polymer in the invention is not particularly limited, but in a range of preferably 10,000 to 1,000,000, more preferably 20,000 to 500,000 in view of strength of a molded product.

A glass transition temperature (Tg) of the biodegradable polymer in the invention is not particularly limited, but in a range of −120 to 80° C., preferably −80 to 70° C., more preferably −50 to 60° C. As the Tg of the biodegradable polymer is in the range described above, the biodegradable polymer exhibits excellent biodegradability and water disintegratability.

[Production Method of Biodegradable Polymer]

Next, a production method of the biodegradable polymer of the invention is detailed below. The biodegradable unit and imine unit described herein is the same as those defined in the biodegradable polymer of the invention.

A production method of the biodegradable polymer of the invention is not uniform but varies with kinds of the chemical bond linking the biodegradable unit with the imine unit. In order to link the biodegradable units with the imine unit, compounds containing each unit need to have two or more specific functional groups, preferably two functional groups to allow linkage of both units. Such functional groups are preferably located at both ends of a molecular chain of the molecule constituting the biodegradable unit and the molecule constituting the imine unit. What kind of chemical bond is used to link both units determines selection of the functional group described above.

A chemical bond to link the biodegradable unit with the imine unit of the invention may have any chemical structure so far as it does not interfere with an objective of the invention, but includes, for example, an ester, amide, urethane, urea or carbonate bond or bond (2) described above.

A functional group that must be provided in a compound containing a biodegradable unit and a compound containing an imine unit in order to make such chemical bonds possible includes a carboxyl, hydroxyl or amino group. A combination of such functional groups has a wide variety.

<Specific Examples of Combination of Functional Groups>

A combination of the functional groups according to kinds of the bond is specifically described. When the biodegradable units are linked via an ester bond with the imine unit to produce the biodegradable polymer, the functional groups used in both units are two kinds of the carboxyl and hydroxyl groups. Such a combination includes a combination of a compound containing the biodegradable unit having two carboxyl groups with a compound containing the imine unit having two hydroxyl groups, a combination of a compound containing the biodegradable unit having two hydroxyl groups with a compound containing the imine unit having two carboxyl groups or a combination of a compound containing the biodegradable unit having one carboxyl group and one hydroxyl group with a compound containing the imine unit having one carboxyl group and one hydroxyl group. When the biodegradable polymer is produced by linking via bond (2), in which $X_1$ and $X_2$ are an ester bond, a compound represented by the following general formula (2'-1) (referred to as "compound (2'-1)" hereinafter) is newly used as a compound leading to said bond. Therefore, a new combination is created. Table 1 shows such a combination.

$$Z_1\text{—}R'\text{—}Z_2 \qquad (2'\text{-}1)$$

In the formula (2'-1), R' is synonymous with R' in the formula (2) and $Z_1$ and $Z_2$ each independently represent a carboxyl or hydroxyl group.

TABLE 1

| | Compound containing biodegradable unit | Compound containing imine unit | Compound (2'-1) |
|---|---|---|---|
| 1 | Compound containing biodegradable unit having two carboxyl groups | Compound containing imine unit having two hydroxyl groups | $Z_1$: Carboxyl group $Z_2$: Hydroxyl group |
| 2 | Compound containing biodegradable unit having two carboxyl groups | Compound containing imine unit having two hydroxyl groups | $Z_1$: Hydroxyl group $Z_2$: Carboxyl group |

TABLE 1-continued

| | Compound containing biodegradable unit | Compound containing imine unit | Compound (2'-1) |
|---|---|---|---|
| 3 | Compound containing biodegradable unit having two carboxyl groups | Compound containing imine unit having two carboxyl groups | $Z_1$: Hydroxyl group<br>$Z_2$: Hydroxyl group |
| 4 | Compound containing biodegradable unit having two carboxyl groups | Compound containing imine unit having two hydroxyl groups | $Z_1$: Hydroxyl group<br>$Z_2$: Hydroxyl group |
| 5 | Compound containing biodegradable unit having two carboxyl groups | Compound containing imine unit having two hydroxyl groups | $Z_1$: Carboxyl group<br>$Z_2$: Carboxyl group |
| 6 | Compound containing biodegradable unit having two hydroxyl groups | Compound containing imine unit having two carboxyl groups | $Z_1$: Carboxyl group<br>$Z_2$: Hydroxyl group |
| 7 | Compound containing biodegradable unit having two hydroxyl groups | Compound containing imine unit having two carboxyl groups | $Z_1$: Hydroxyl group<br>$Z_2$: Carboxyl group |
| 8 | Compound containing biodegradable unit having two hydroxyl groups | Compound containing imine unit having two hydroxyl groups | $Z_1$: Carboxyl group<br>$Z_2$: Carboxyl group |
| 9 | Compound containing biodegradable unit having two hydroxyl groups | Compound containing imine unit having two carboxyl groups | $Z_1$: Carboxyl group<br>$Z_2$: Carboxyl group |
| 10 | Compound containing biodegradable unit having two hydroxyl groups | Compound containing imine unit having two carboxyl groups | $Z_1$: Hydroxyl group<br>$Z_2$: Hydroxyl group |
| 11 | Compound containing biodegradable unit having one carboxyl group and one hydroxyl group | Compound containing imine unit having two carboxyl groups | $Z_1$: Hydroxyl group<br>$Z_2$: Hydroxyl group |
| 12 | Compound containing biodegradable unit having one carboxyl group and one hydroxyl group | Compound containing imine unit having two hydroxyl groups | $Z_1$: Carboxyl group<br>$Z_2$: Carboxyl group |
| 13 | Compound containing biodegradable unit having one carboxyl group and one hydroxyl group | Compound containing imine unit having one carboxyl group and one hydroxyl group | $Z_1$: Carboxyl group<br>$Z_2$: Hydroxyl group |
| 14 | Compound containing biodegradable unit having one carboxyl group and one hydroxyl group | Compound containing imine unit having one carboxyl group and one hydroxyl group | $Z_1$: Hydroxyl group<br>$Z_2$: Carboxyl group |

Next, a combination is described when the biodegradable polymer is produced with a linkage of an amide bond or bond (2), in which $X_1$ and $X_2$ are an amide bond.

When the biodegradable polymer is produced by linkage of the amide bond, a combination includes a combination of a compound containing the biodegradable unit having two carboxyl groups with a compound containing the imine unit having two amino groups, a combination of a compound containing the biodegradable unit having two amino groups with a compound containing the imine unit having two carboxyl groups or a combination of a compound containing the biodegradable unit with a compound containing the imine unit, in which each unit has one carboxyl group and one amino group. When the biodegradable polymer is produced by linking via bond (2), in which $X_1$ and $X_2$ are an amide bond, compounds represented by the following general formula (2'-2) (referred to as "compound (2'-2)" hereinafter) are further newly used as a compound leading to said bond. Table 2 shows such a combination.

$$Z_3-R'-Z_4 \qquad (2'-2)$$

In the formula (2'-2), R' is synonymous with R' in the formula (2) described above and $Z_3$ and $Z_4$ each independently represent a carboxyl or amino group.

TABLE 2

| | Compound containing biodegradable unit | Compound containing imine unit | Compound (2'-2) |
|---|---|---|---|
| 1 | Compound containing biodegradable unit having two carboxyl groups | Compound containing imine unit having two amino groups | $Z_3$: Carboxyl group<br>$Z_4$: Amino group |
| 2 | Compound containing biodegradable unit having two carboxyl groups | Compound containing imine unit having two amino groups | $Z_3$: Amino group<br>$Z_4$: Carboxyl group |
| 3 | Compound containing biodegradable unit having two carboxyl groups | Compound containing imine unit having two amino groups | $Z_3$: Amino group<br>$Z_4$: Amino group |
| 4 | Compound containing biodegradable unit having two carboxyl groups | Compound containing imine unit having two amino groups | $Z_3$: Carboxyl group<br>$Z_4$: Carboxyl group |
| 5 | Compound containing biodegradable unit having two carboxyl groups | Compound containing imine unit having two carboxyl groups | $Z_3$: Amino group<br>$Z_4$: Amino group |
| 6 | Compound containing biodegradable unit having two amino groups | Compound containing imine unit having two carboxyl groups | $Z_3$: Carboxyl group<br>$Z_4$: Amino group |
| 7 | Compound containing biodegradable unit having two amino groups | Compound containing imine unit having two carboxyl groups | $Z_3$: Amino group<br>$Z_4$: Carboxyl group |
| 8 | Compound containing biodegradable unit having two amino groups | Compound containing imine unit having two carboxyl groups | $Z_3$: Amino group<br>$Z_4$: Amino group |
| 9 | Compound containing biodegradable unit having two amino groups | Compound containing imine unit having two carboxyl groups | $Z_3$: Carboxyl group<br>$Z_4$: Carboxyl group |
| 10 | Compound containing biodegradable unit having two amino groups | Compound containing imine unit having two amino groups | $Z_3$: Carboxyl group<br>$Z_4$: Carboxyl group |
| 11 | Compound containing biodegradable unit having one carboxyl group and one amino group | Compound containing imine unit having two amino groups | $Z_3$: Carboxyl group<br>$Z_4$: Carboxyl group |

TABLE 2-continued

| Compound containing biodegradable unit | Compound containing imine unit | Compound (2'-2) |
|---|---|---|
| 12 Compound containing biodegradable unit having one carboxyl group and one amino group | Compound containing imine unit having two carboxyl groups | $Z_3$: Amino group<br>$Z_4$: Amino group |
| 13 Compound containing biodegradable unit having one carboxyl group and one amino group | Compound containing imine unit having one carboxyl group and one amino group | $Z_3$: Carboxyl group<br>$Z_4$: Amino group |
| 14 Compound containing biodegradable unit having one carboxyl group and one hydroxyl group | Compound containing imine unit having one carboxyl group and one amino group | $Z_3$: Amino group<br>$Z_4$: Carboxyl group |

Next, a combination is described when the biodegradable polymer linked with a urethane bond or bond (2), in which $X_1$ and $X_2$ are a urethane bond is produced.

When the biodegradable polymer linked by the urethane bond is produced, a combination includes a combination of a compound containing the biodegradable unit having two hydroxyl groups with a compound containing the imine unit having two amino groups, a combination of a compound containing the biodegradable unit having two amino groups with a compound containing the imine unit having two hydroxyl groups and a combination of a compound containing the biodegradable unit with a compound containing the imine unit, in which each unit has one hydroxyl group and one amino group. When the biodegradable polymer linked via the bond (2), in which $X_1$ and $X_2$ are a urethane bond, is produced, the compound represented by the following general formula (2'-3) (referred to as "compound (2'-3)" hereinafter) are newly further used as a compound leading to said bond. Table 3 shows such a combination.

$$Z_5\text{—}R'\text{—}Z_6 \quad (2'\text{-}3)$$

In the formula (2'-3), R' is synonymous with R' in the formula (2) described above and $Z_5$ and $Z_6$ each independently represent a hydroxyl or amino group.

TABLE 3

| | Compound containing biodegradable unit | Compound containing imine unit | Compound (2'-3) |
|---|---|---|---|
| 1 | Compound containing biodegradable unit having two hydroxyl groups | Compound containing imine unit having two amino groups | $Z_5$: Hydroxyl group<br>$Z_6$: Amino group |
| 2 | Compound containing biodegradable unit having two hydroxyl groups | Compound containing imine unit having two amino groups | $Z_5$: Amino group<br>$Z_6$: Hydroxyl group |
| 3 | Compound containing biodegradable unit having two amino groups | Compound containing imine unit having two hydroxyl groups | $Z_5$: Hydroxyl group<br>$Z_4$: Amino group |
| 4 | Compound containing biodegradable unit having two amino groups | Compound containing imine unit having two hydroxyl groups | $Z_5$: Amino group<br>$Z_6$: Hydroxyl group |
| 5 | Compound containing biodegradable unit having two hydroxyl groups | Compound containing imine unit having two hydroxyl groups | $Z_5$: Amino group<br>$Z_6$: Amino group |
| 6 | Compound containing biodegradable unit having two amino groups | Compound containing imine unit having two amino groups | $Z_5$: Hydroxyl group<br>$Z_6$: Hydroxyl group |
| 7 | Compound containing biodegradable unit having one hydroxyl group and one amino group | Compound containing imine unit having one hydroxyl group and one amino group | $Z_5$: Hydroxyl group<br>$Z_6$: Amino group |
| 8 | Compound containing biodegradable unit having one hydroxyl group and one amino group | Compound containing imine unit having one hydroxyl group and one amino group | $Z_5$: Amino group<br>$Z_6$: Hydroxyl group |

Next, a combination is described when the biodegradable polymer linked by a urea bond or bond (2), in which $X_1$ and $X_2$ are urea bonds, is produced.

When the biodegradable polymer linked by the urea bond is produced, a combination includes a combination of a compound containing the biodegradable unit having two amino groups with a compound containing the imine unit having two amino groups. When the biodegradable polymer linked by the bond (2), in which $X_1$ and $X_2$ are urea bonds, is produced, the compounds represented by the following general formula (2'-4) (also referred to as "compound (2'-4)" hereinafter) are newly further used as a compound leading to said bond. Table 4 shows such a combination.

$$Z_7\text{—}R'\text{—}Z_8 \quad (2'\text{-}4)$$

In the formula (2'-4), R' is synonymous with R' in the formula (2) described above and $Z_7$ and $Z_8$ represent an amino group.

TABLE 4

| Compound containing biodegradable unit | Compound containing imine unit | Compound (2'-4) |
| --- | --- | --- |
| 1 Compound containing biodegradable unit having two amino groups | Compound containing imine unit having two amino groups | $Z_7$: Amino group<br>$Z_8$: Amino group |

Next, a combination is described when the biodegradable polymer linked by the carbonate bond or bond (2), in which $X_1$ and $X_2$ are carbonate bonds is produced.

When the biodegradable polymer linked by the carbonate bond is produced, a combination includes a combination of a compound containing the biodegradable unit having two hydroxyl groups with a compound containing the imine unit having two hydroxyl groups. When the biodegradable polymer by the bond (2), in which $X_1$ and $X_2$ are carbonate bonds, is produced, compounds represented by the general formula (2'-5) (also referred to as "compound (2'-5)" hereinafter) are newly further used as a compound leading to said bond. Table 5 shows such a combination.

$$Z_9 - R' - Z_{10} \quad (2'\text{-}5)$$

In the formula (2'-5), R' is synonymous with R' in the formula (2) described above and $Z_9$ and $Z_{10}$ represent a hydroxyl group.

TABLE 5

| Compound containing biodegradable unit | Compound containing imine unit | Compound (2'-5) |
| --- | --- | --- |
| 1 Compound containing biodegradable unit having two hydroxyl groups | Compound containing imine unit having two hydroxyl groups | $Z_7$: Hydroxyl group<br>$Z_8$: Hydroxyl group |

It is described above that functional groups to be contained in the compound containing the biodegradable unit may differ from those in the compound containing the imine unit and their combination may also differ, depending on kinds of a bond to be linked. The compound containing the biodegradable unit and the compound containing the imine unit used in a production method of the invention may be summarized as follows.

Firstly, the compound containing the biodegradable unit and the production method thereof are described.

The compound containing the biodegradable unit having two functional groups described above includes the compound containing the biodegradable unit having two carboxyl groups, the compound containing the biodegradable unit having two hydroxyl groups, the compound containing the biodegradable unit having one carboxyl group and one hydroxyl group, the compound containing the biodegradable unit having two amino groups, the compound containing the biodegradable unit having one carboxyl group and one amino group and the compound containing the biodegradable unit having one hydroxyl group and one amino group, and the like.

The production method of the compound containing the biodegradable unit having two functional groups described above, for example, in a case of the compound containing the biodegradable unit having two carboxyl groups, includes, a production method via a dehydration reaction of dibasic acids with divalent aliphatic alcohols under the condition at a molar ratio of the carboxyl group to the hydroxyl group to be larger than 1 or a production method via a dehydration reaction of dibasic acids with divalent aliphatic amines under the condition at a molar ratio of the carboxyl group to the amino group to be larger than 1. In a case of the compound containing the biodegradable unit having two hydroxyl groups, it includes a production method via a dehydration reaction of dibasic acids with divalent aliphatic alcohols under the condition at a molar ratio of the carboxyl group to the hydroxyl group to be less than 1. In a case of the compound containing the biodegradable unit having one carboxyl group and one hydroxyl group, it includes a production method via a dehydration reaction of hydroxycarboxylic acids. In a case of the compound containing the biodegradable unit having two amino groups, it includes a production method via a dehydration reaction of dibasic acids with divalent aliphatic amines under the condition at a molar ratio of the carboxyl group to the amino group to be less than 1. In a case of the compound containing the biodegradable unit having one carboxyl group and one amino group, it includes a production method via a dehydration reaction of amino acids. In case of the compound containing the biodegradable unit having one hydroxyl group and one amino group, it includes a production method via a dehydration reaction of dibasic acids with divalent aliphatic alcohols and divalent aliphatic amines under the condition at a molar ratio of the carboxyl group to a sum of the hydroxyl group and the amino group to be less than 1.

Next, the compound containing the imine unit having two functional groups are represented by the general formulas (3) and (3') below.

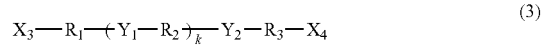

$$X_3 - R_1 - (Y_1 - R_2)_k - Y_2 - R_3 - X_4 \quad (3)$$

$$X_3 - R_4 - (Y_3 - R_5 - Y_4 - R_6)_k - Y_5 - R_7 - Y_6 - R_8 - X_4 \quad (3')$$

In the formulas (3) and (3'), $R_1$ to $R_8$, $Y_1$ to $Y_6$ and k are the same as those in the imine unit defined in the biodegradable polymer of the invention and $X_3$ and $X_4$ represent the carboxyl, hydroxyl or amino group and each may be the same or different.

The Compounds containing the imine unit having two functional groups can be produced by a known method. In case of the compound containing the imine unit having two functional groups, in which R in $Y_1$ to $Y_6$ is a hydrogen atom, the compound containing the imine unit having two functional groups can be obtained, for example, by a dehydration reaction of an aldehyde compound having a desired functional group with an amine compound having a desired functional group. In case of the compound containing the imine unit having two functional groups, in which R in $Y_1$ to $Y_6$ is a $C_1$-$C_{20}$ aliphatic hydrocarbon group, the compound containing the imine unit having two functional groups can be obtained, for example, by a reaction of a ketone compound having a desired functional group with an amine compound having a desired functional group.

<Specific Embodiment in Production Method of Biodegradable Polymer>

The biodegradable polymer of the invention can be produced by linking the compound containing the biodegradable unit having two functional groups with the compound containing the imine unit having two functional groups. Such a production method varies with kinds of a chemical bond linking both units and is roughly divided into two methods, one using a condensing agent and the other using a linking agent. In the former case, the chemical bond for linking is an ester or amide bond or bond (2), in which $X_1$ and/or $X_2$ is an ester or amide bond, while in the latter case, it is a urethane, urea or carbonate bond or bond (2), in which $X_1$ and/or $X_2$ is a urethane, urea or carbonate bond.

In production of the biodegradable polymer, it may be carried out by a production method using a linking agent after it is carried out by a production method using a condensing agent or it may be carried out by a production method using a condensing agent after it is carried out by a production method using a linking agent.

A production method to use a condensing agent is first described. A compound containing the biodegradable unit having two functional groups can be reacted with a compound containing the imine unit having two functional groups and a condensing agent to produce the biodegradable polymer linked by an ester or amide bond or bond (2), in which $X_1$ and/or $X_2$ is an ester or amide bond.

A combination of constituting units in the production method herein uses a combination of those illustrated in the biodegradable polymer linked by the ester bond illustrated above in case of the ester bond for the linking unit. A combination of constituting units illustrated in the biodegradable polymer linked by the amide bond illustrated above can be used in case of the amide bond for the linking unit. A combination of constituting units illustrated in Table 1 is used in case of bond (2), in which $X_1$ and $X_2$ is an ester bond for the linking unit. A combination of constituting units illustrated in Table 2 is used in case of bond (2), in which $X_1$ and $X_2$ is an amide bond for the linking unit. Two kinds or more of such combinations may be further used or two kinds or more of a combination illustrated in case of the ester bond, a combination illustrated in case of the amide bond or a combination illustrated in bond (2), in which $X_1$ and $X_2$ is an ester or amide bond may be used together.

Condensing agents used in a production method of the invention include, for example, 2-chloro-1-methylpyridinium iodide, 2-bromo-1-methylpyridinium iodide, 2-chloro-1-ethylpyridinium tetrafluoroborate, 2-bromo-1-ethylpyridinium tetrafluoroborate, and the like. 2-Chloro-1-methylpyridinium iodide, 2-chloro-1-ethylpyridinium tetrafluoroborate and 2-bromo-1-ethylpyridinium tetrafluoroborate are preferred. 2-Chloro-1-methylpyridinium iodide and 2-bromo-1-ethylpyridinium tetrafluoroborate are more preferred.

Condensing agents described above may be used in one kind singly or two kinds or more in combination. A molar quantity of the condensing agent used is generally 1.0 to 3.0 times, preferably 1.1 to 2.5 times, more preferably 1.2 to 2.0 times greater than a total molar quantity of the carboxyl groups contained in the compound containing the biodegradable unit and the compound containing the imine unit as a constituent raw material for the biodegradable polymer.

A base is generally used to neutralize a hydrogen halide, which is formed as a byproduct when producing the biodegradable polymer by this method. Such a base includes triethylamine, tripropylamine, triisopropylamine, tributylamine, tripentylamine, trioctylamine, triisooctylamine, N,N'-diisopropylethylamine, N,N-dimethyl-n-octylamine, N,N-dimethylisopropylamine, tris(2-ethylhexyl)amine, N,N-dimethylethylamine, N,N-diethylmethylamine, N,N-dicyclohexylmethylamine, N,N-dimethylcyclohexylamine, tribenzylamine, triphenylamine, N-benzyldiethylamine, triethylenediamine, hexamethylenetetramine, N,N,N',N'-tetramethylethylenediamine, bis(2-dimethylaminoethyl)ether, pyridine, 4-dimethylaminopyridine, picoline, N,N-dimethylaniline, N,N-diethylaniline, N-ethyl-N-methylaniline, 2,6-lutidine, and the like. Among them, triethylamine, tripropylamine, triisopropylamine, tributylamine, tripentylamine, trioctylamine, triisooctylamine, N,N'-diisopropylethylamine, N,N-dimethyl-n-octylamine, N,N-dimethylisopropylamine and tris(2-ethylhexyl)amine are preferred and triethylamine, tripropylamine, triisopropylamine and tributylamine are more preferred.

A base described above may be used in one kind singly or two kinds or more in combination. A molar quantity of the base used is generally 1.0 to 6.0 times, preferably 2.2 to 5.0 times, more preferably 2.4 to 4.0 times greater than a molar quantity of the condensing agent used.

A molar ratio of the compound containing the biodegradable unit to the compound containing the imine unit used in the production method is generally in a range of 0.5 to 2.0, preferably in a rage of 0.8 to 1.5, more preferably in a range of 0.9 to 1.1.

A production method using the condensing agent preferably uses an organic solvent such as dichloromethane, chloroform, and the like. A reaction temperature depends on a boiling point of the organic solvent used, but is preferably in a range of 10 to 100° C., more preferably in a range of 20 to 50° C. Reaction is preferably carried out under atmosphere of an inert gas such as nitrogen, argon, and the like, in order to prevent the condensing agent from deactivation by moisture.

When the biodegradable polymer reaches a desired molecular weight, in order to remove impurities such as a salt of a hydrogen halide with a base, an organic solvent such as methanol, ethanol and isopropyl alcohol, in which impurities are soluble but a polymer is insoluble, is used to reprecipitate or wash and purify the biodegradable polymer. After purification, an organic solvent used in purification is removed by vacuum drying, heat drying, and the like.

While a production method using the condensing agent is described above, an acid chloride represented by the following general formula (4) (referred to as simply "acid chloride" hereinafter) can be used as other method to produce the biodegradable polymer linked by bond (2), in which $X_1$ and $X_2$ are an ester or amide bond.

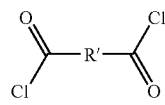

(4)

In the formula (4), R' is synonymous with R' in the formula (2) described above.

Specifically a combination of a compound containing the biodegradable unit having two hydroxyl groups with a compound containing the imine unit having two hydroxyl groups and an acid chloride or a combination of a compound containing the biodegradable unit having two amino groups with a compound containing the imine unit having two amino groups and an acid chloride is used to yield a biodegradable polymer linked by bond (2), in which $X_1$ and $X_2$ each are an ester or amide bond. An amount of the acid chloride used in this production method is generally in a range of 0.25 to 4.0 mol %, preferably 0.3 to 3.0 mol, more preferably 0.4 to 1.0 mol, further more preferably 0.45 to 0.6 mol relative to a total mol of the hydroxyl group contained in the constituting units described above.

A base illustrated in the production method using the condensing agent is generally used to neutralize a hydrogen halide generated as byproducts, when the acid chloride described above is used to produce the biodegradable polymer. This base may be used in one kind singly or two kinds or more in combination. A molar quantity of the base used in this production method is generally 1.5 to 6.0 times, preferably 2.2 to 5.0 times, more preferably 2.4 to 4.0 times greater than a molar quantity of the acid chloride used.

A molar ratio of a compound containing the biodegradable unit to a compound containing the imine unit in the production method using the acid chloride described above is generally in a range of 0.5 to 2.0, preferably in a range of 0.8 to 1.5, more preferably in a range of 0.9 to 1.1.

In the production method using the acid chloride described above, an organic solvent such as dichloromethane, chloroform and the like is preferably used. A reaction temperature depends on a boiling point of the organic solvent used, but is preferably in a range of −30 to 100° C., more preferably in a range of −10 to 50° C. Reaction is preferably carried out under atmosphere of an inert gas such as nitrogen, argon, and the like, in order to prevent an acid chloride from deactivation by moisture.

When the biodegradable polymer reaches a desired molecular weight, in order to remove impurities such as a salt of a hydrogen halide with a base, an organic solvent such as methanol, ethanol, isopropyl alcohol, and the like, in which impurities are soluble but a polymer is insoluble is used to reprecipitate or wash and purify the biodegradable polymer. After purification, an organic solvent used in purification is removed by vacuum drying, heat drying, and the like.

Next, a production method using a linking agent is described. A compound containing the biodegradable unit having two functional groups can be reacted with a compound containing the imine unit having two functional group and a linking agent to produce the biodegradable polymer linked by a urethane, urea or carbonate bond or bond (2), in which $X_1$ and/or $X_2$ is a urethane, urea or carbonate bond.

As a combination of the constituting unit in this production method, when the linking unit is a urethane bond, a combination of the constituting units illustrated in the biodegradable polymer linked by a urethane bond described above is used. A combination of the constituting unit illustrated in the biodegradable polymer linked by a urea bond described above is also used in case of a urea bond for the linking unit. A combination of the constituting unit illustrated in the biodegradable polymer linked by a carbonate bond described above is also used in case of a carbonate bond for the linking unit. Further, in the case of bond (2), in which $X_1$ and $X_2$ for the linking unit are urethane bonds, a combination of the constituting unit illustrated in Table 3 is used. A combination of the comprising region illustrated in Table 4 is used in case of bond (2), in which $X_1$ and $X_2$ are a urea bond for the linking unit. A combination of the constituting unit illustrated in Table 5 is used in case of bond (2), in which $X_1$ and $X_2$ are a carbonate bond for the linking unit. Two kinds or more of these combinations may be further used or two kinds or more of a combination illustrated in case of the urethane bond, a combination illustrated in case of the urea bond, a combination illustrated in case of the carbonate bond, or a combination illustrated in bond (2), in which $X_1$ and/or $X_2$ is a urethane, urea or carbonate bond may be used together.

A linking agent used in the production method includes, for example, phosgene, carbonates, chloroformates, and the like. The chloroformates include, for example, methyl chloroformate, ethyl chloroformate, propyl chloroformate, butyl chloroformate, phenyl chloroformate, and the like and the carbonates include, for example, dimethyl carbonate, diethyl carbonate, ethylmethyl carbonate, diphenyl carbonate, dipropyl carbonate, dibutyl carbonate, dibenzyl carbonate, and the like. Among them, ethyl chloroformate and carbonate esters are preferred, carbonate esters are more preferred and dimethyl carbonate or diethyl carbonate is further more preferred.

A molar quantity of the linking agent used is generally 0.25 to 4.0 times, preferably 0.3 to 3.0 times, more preferably 0.4 to 1.0 times, further more preferably 0.45 to 0.6 times greater than a total molar quantity of the hydroxyl or amino group contained in a compound containing the biodegradable unit and a compound containing the imine unit as a constituting raw material of the biodegradable polymer.

A catalyst is preferably added to promote the reaction of the compound containing the biodegradable unit with the compound containing the imine unit and the linking agent when the carbonate is used as the linking agent. The catalyst includes dibutyltin diacetate, dibutyltin dilaurate, sodium methoxide or titanium (IV) acetylacetonate.

The catalyst may be used in one kind singly or two kinds or more in combination. An amount of the catalyst used is generally in a range of 10 to 1,000 ppm, preferably 30 to 800 ppm, more preferably 80 to 500 ppm relative to a total weight of the compound containing the biodegradable unit having two functional groups, the compound containing the imine unit and the linking agent.

A base illustrated in the production method using a condensing agent is generally used to neutralize a hydrogen halide generated as byproducts when phosgene or chloroformate is used as a linking agent. This base may be used in one kind singly or two kinds or more in combination. A molar quantity of the base used in this production method is generally 1.5 to 6.0 times, preferably 2.2 to 5.0 times, more preferably 2.4 to 4.0 times greater than a molar quantity of the acid chloride used.

A molar ratio of a compound containing the biodegradable unit described above to a compound containing the imine unit described above used in the present production method is generally in a range of 0.5 to 2.0, preferably in a range of 0.8 to 1.5, more preferably in a range of 0.9 to 1.1.

In the production method using the linking agent, when the carbonate is used, it may be produced by using an organic solvent such as methylene chloride, chloroform, tetrahydrofuran and dimethylformamide, if needed or may be produced in a condition that raw materials or products may be melted without using a solvent. The organic solvent is also preferably used when phosgene or chloroformate is used.

A reaction temperature depends on a boiling point of an organic solvent used as needed, but is preferably in a range of 50 to 300° C., more preferably in a range of 60 to 220° C. when carbonate is used as a liking agent. It is preferably in a range of −78 to 60° C., more preferably in a range of −10 to 40° C. when phosgene or chloroformate is used as a linking agent.

When carbonates are used as a linking agent, reaction is preferably carried out under a stream of an inert gas such as nitrogen and argon or under reduced pressure in order to remove alcohols formed as byproducts. It is also preferably carried out under atmosphere of an inert gas such as nitrogen and argon in order to prevent the linking agent from deactivation with moisture in air when phosgene or chloroformate is used as a linking agent.

In the case that the biodegradable polymer reached a desired molecular weight, when an organic solvent was used in production, an organic solvent such as methanol, ethanol, isopropyl alcohol and hexane, in which a biodegradable polymer is insoluble, may be used to reprecipitate or wash to purify the biodegradable polymer, or an organic solvent used may be removed to dry the biodegradable polymer to a solid. On the other hand, when an organic solvent was not used in production, a biodegradable polymer in a molten state is preferably discharged as it is, and after discharge the biodegradable polymer may be dissolved in an organic solvent such as methylene chloride, chloroform and dimethylformamide to purify similarly to a case using the organic solvent in production. After purification or discharge, the biodegradable polymer is dried under reduce pressure or on heating.

While a production method using a linking agent is described above, a diisocyanate compound represented by the following general formula (5) (referred to as simply "diisocyantes" hereinafter) may be used as a linking agent alternatively when the biodegradable polymer linked with bond (2), in which $X_1$ and $X_2$ are a urethane or urea bond is produced.

$$O=C=N-R'-N=C=O \qquad (5)$$

In the formula (5), R' is synonymous with R' in the formula (2) described above.

Specifically, a combination of a compound containing the biodegradable unit having two hydroxyl groups with a compound containing the imine unit having two hydroxyl groups and diisocyantes is used to yield the biodegradable polymer linked with bond (2), in which $X_1$ and $X_2$ are a urethane bond. A combination of a compound containing the biodegradable unit having two amino groups with a compound containing the imine unit having two amino groups and diisocyantes can be also used to yield the biodegradable polymer linked with bond (2), in which $X_1$ and $X_2$ are a urea bond. Two kinds or more combinations among the combinations illustrated in bond (2), in which $X_1$ and/or $X_2$ are a urethane or urea bond may be used together.

A molar quantity of the diisocyantes used is generally 0.25 to 4.0 times, preferably 0.3 to 3.0 times, more preferably 0.4 to 1.0 times, further more preferably 0.45 to 0.6 times greater than a total molar quantity of the hydroxyl or amino group contained in a compound containing the biodegradable unit and a compound containing the imine unit as a constituting raw material of the biodegradable polymer.

When the linking unit is the bond (2) in which $X_1$ and $X_2$ is a urethane bond, a catalyst is preferably added to promote the reaction of the compound containing the biodegradable unit with the compound containing the imine unit and the linking agent.

The catalyst includes, for example, stannous octate, dibutyltin diacetate, dibutyltin dioctate, dibutyltin dilaurate, dioctyltin dilaurate, sodium o-phenylphenate, tetra(2-ethylhexyl) titanate, stannic chloride, ferric chloride, ferric octate, cobalt octate, zinc naphthenate, triethylamine, triethylenediamine, and the like. Dibutyltin diacetate, dibutyltin dioctate, dibutyltin dilaurate, sodium o-phenylphenate, tetra(2-ethylhexyl) titanate, stannic chloride or ferric chloride is preferred.

The catalyst may be used in one kind singly or two kinds or more in combination. An amount of the catalyst used is generally in a range of 10 to 1,000 ppm, preferably 30 to 800 ppm, more preferably 80 to 500 ppm relative to a total weight of the compound containing the biodegradable unit having two functional groups, the compound containing the imine unit and the diisocyanates.

A molar ratio of a compound containing the biodegradable unit to a compound containing the imine unit in the production method is generally in a range of 0.5 to 2.0, preferably in a range of 0.8 to 1.5, more preferably in a range of 0.9 to 1.1.

In the production method using the linking agent, it may be produced by using an organic solvent such as methylene chloride, chloroform, tetrahydrofuran and dimethylformamide if needed or may be produced in a condition that raw materials or products are melted without using a solvent.

A reaction temperature depends on a boiling point of a organic solvent used as needed or a melting point of a compound containing the biodegradable unit and/or a compound containing the imine unit, but is preferably in a range of 10 to 200° C., more preferably in a range of 20 to 180° C. Reaction is preferably carried out under atmosphere of an inert gas such as nitrogen and argon, in order to prevent the isocyanate group of the linking agent from reaction with moisture in the air.

A reaction sequence of a compound containing the biodegradable unit, a compound containing the imine unit and diisocyantes may be as such that the compound containing the biodegradable unit, the compound containing the imine unit and the diisocyantes are reacted simultaneously or either the compound containing the biodegradable unit or the compound containing the imine unit is reacted with the diisocyantes first, and then the compound containing the other unit is reacted. Either the compound containing the biodegradable unit or the compound containing the imine unit may be reacted with a large excess of the diisocyantes first, and then reacted with the compound containing the other unit, after removing an unreacted linking agent using a high vacuum thin film evaporator and the like.

In the case that the biodegradable polymer reached a desired molecular weight, when an organic solvent was used in the production, an organic solvent such as methanol, ethanol, isopropyl alcohol and hexane, in which a biodegradable polymer is insoluble, may be used to reprecipitate or wash and purify the biodegradable polymer, or an organic solvent used may be removed to dry the biodegradable polymer to a solid. On the other hand, when an organic solvent was not used in production, a biodegradable polymer in a molten state is preferably discharged as it is, and after discharge, the biodegradable polymer may be dissolved in an organic solvent such as methylene chloride, chloroform and dimethylformamide to purify similarly to the case using the organic solvent in production. After purification, discharge or the like, the biodegradable polymer is dried under reduced pressure or on heating. In the production method using the diisocyanates, extruders such as a single-screw or twin-screw extruder or a kneading machines such as a kneader may be used to produce the biodegradable polymer. Also, after completion of the reaction or purification, the diisocyanates may be added to react unreacted hydroxyl or amino group remained with isocyanate groups to convert the biodegradable polymer to a higher molecular weight.

[Molded Product of Biodegradable Polymer]

A biodegradable polymer of the invention is not limited in the form of a molded product, but may be molded in molded products in a form of films, sheets, vessels with a shape meeting its use, nonwoven fabrics, and the like. In this case such molded products may contain common biodegradable polymers such as polyethylene glycol, vinyl alcohol, polylactic acid and polybutylene succinate.

Various additives can be added according to the objective to the biodegradable polymer of the invention. The additives include, for example, plasticizers, fillers, antioxidants, UV absorbers, heat stabilizers, fire retardants, mold release agents, inorganic additives, nucleating agents, antistatic agents, pigments, antiblocking agents, and the like.

Plasticizers used are preferably biodegradable and miscible with the biodegradable polymer of the invention. For example, they include monovalent or polyvalent fatty acid ester-based plasticizers, monovalent or polyvalent aliphatic alcohol ester-based plasticizers, polyalkylene glycol-based plasticizers, aliphatic polyester-based plasticizers, and the like. Specifically listed are phthalic acid derivates such as di-n-octyl phthalate, di-2-ethylhexyl phthalate, dibenzyl phthalate and the like, isophthalic acid derivatives such as dioctyl isophthalate and the like, adipic acid derivatives such as di-n-butyl adipate, dioctyl adipate and the like, maleic acid derivatives such as di-n-butyl maleate and the like, citric acid derivatives such as tri-n-butyl citrate and the like, itaconic acid derivatives such as monobutyl itaconate and the like, oleic acid derivatives such as butyl oleate and the like, ricinoleic acid derivatives such as glyceryl monoricinoleate and the like, phosphoric acid ester derivatives such as tricresyl phosphate, trixylenyl phosphate and the like, triethyl acetylcitrate, tributyl acetylcitrate, lactic acid, linear chain lactic acid oligomers, cyclic lactic acid oligomers, lactides and the like. At least one kind of an ester compound having two or more carboxylic acid esters within a molecule selected from citric acid esters, glyceryl esters, phthalic acid esters, adipic acid esters, sebacic acid esters, azelaic acid esters and triethylene glycol esters is particularly preferred. Such a plasticizer may be used in one kind singly or two kinds or more in combination.

Addition of various additives such as plasticizers, inorganic fillers, dispersants and stabilizers to the biodegradable polymer of the invention can be carried out by the continuous kneading using a single-screw or twin-screw extruder after mixing using a Henschel mixer, a Supermixer, a tumbler mixer and the like. A twin-screw extruder is herein preferred in order to further improve dispersion of the biodegradable polymer, fillers and the like.

A method to obtain a film or sheet consisting of the biodegradable polymer of the invention is not particularly limited, but a known molding method is used to mold in a form of a film or sheet. A method to mold in a form of a film or sheet includes a T-die molding method, an inflation molding method, a calender molding method, a heat press molding method and the like. Such a film or sheet may be stretched at least in one direction. A stretching method is not particularly limited, but includes a roll stretching method, a tenter stretching method, an inflation method and the like.

A method to obtain a molded product consisting of a the biodegradable polymer of the invention with a shape suitable for its use is not particularly limited, but it can be produced by a known method, which for example, includes a method to mold by extrusion or injection molding using a die.

A molded product of the biodegradable polymer of the invention is preferably molded in thinner thickness in order to increase its water disintegratability and biodegradability, but its thickness can be freely adjusted to satisfy strength, flexibility and the like. Thickness of a film is preferably 5 to 300 μm, more preferably 10 to 100 μm. Thickness of a molded product in a form of a sheet or vessel shape is preferably 0.1 to 5 mm, more preferably 0.2 to 2 mm. Elastic modulus is also not particularly limited in the value, but generally preferably 1,200 MPa or less, more preferably 600 MPa or less. Tensile strength is not particularly limited in the value, but preferably in a range of 10 to 100 MPa, more preferably in a range of 15 to 70 MPa, further more preferably in a range of 20 to 50 MPa.

An inorganic additive can be added to the biodegradable polymer of the invention and addition of a particular inorganic additive can increase the water disintegratability of the biodegradable polymer of the invention. Such inorganic additives are not particularly limited, but include preferably inorganic oxides and zeolites, more preferably inorganic oxides.

The inorganic oxides include silica, alumina, titanium oxide, white clay, diatomaceous earth, acid earth and the like and zeolites include philipsite, mordenite, clinoptilolite, harmotome, merlinoite, shabasite, erionite, natrolite, heulandite, faujacite and the like.

The inorganic additives may be used in one kind singly or two kinds or more in combination. A formulation condition of a biodegradable polymer resin composition containing the biodegradable polymer of the invention and the inorganic additive is that the inorganic additive is in a range of 0.01 to 50 parts by weight, preferably in a range of 0.1 to 40 parts by weight, more preferably in a range of 0.5 to 30 parts by weight, further more preferably in a range of 1 to 20 parts by weight relative to 100 parts by weight of the biodegradable polymer.

An average particle diameter of the inorganic additive is preferably 30 μm or less, more preferably 10 μm or less, particularly preferably in a range of 0.7 to 5 μm. When a particle diameter is too large, fineness of a pore of the film becomes poor, while when too small, dispersion in the resin becomes poor. Such inorganic additives may be added in order to improve its permeability, for example, when the molded product is a film.

An inorganic filler and/or organic filler can be further added in order to improve permeability of the film of the invention. The inorganic filler includes calcium carbonate, talc, clay, kaolin, magnesium carbonate, barium carbonate, magnesium sulfate, barium sulfate, calcium sulfate, aluminum hydroxide, zinc oxide, magnesium hydroxide, calcium oxide, magnesium oxide, mica and the like. Among them calcium carbonate, magnesium oxide, barium sulfate, talc and clay are preferred. An organic filler also includes cellulose powder such as wood powder, pulp powder and the like. Such a filler may be used in one kind singly or two kinds or more in combination.

An average particle diameter of the filler is preferably 30 μm or less, more preferably 10 μm or less, particularly preferably in a range of 0.7 to 5 μm. When a particle diameter is too large, fineness of a pore of the film becomes poor, while when too small, dispersion in the resin becomes poor. A flat unstretched sheet is first formed and then stretched monoaxially in a longitudinal direction or biaxially stretched in both longitudinal and lateral directions to make a film more porous and permeable.

A method to obtain a nonwoven fabric of the biodegradable polymer of the invention is not particularly limited, and nonwoven fabrics can be prepared by a known production method, for example, a dry laid method, a spunbond method, a melt blown method, a wet laid method and the like. That is, the biodegradable polymer of the invention or a composition comprising said biodegradable polymer and an additive is spun into fibers to form a web and the web is bonded with each other by a known method to yield the nonwoven fabric.

A known spinning method is applied as a spinning method of raw fibers. Either singular spinning or composite spinning can be used and in particular, a configuration of the composite spinning includes a core-in-sheath type or parallel type composite spinning. As the spinning method, for example, a melt spinning method to melt-spin using an extruder, a wet spinning method to dissolve the biodegradable polymer or its composition in a solvent and then eject said solution through a nozzle into a poor solvent or a dry spinning method to eject said solution through a nozzle into a dry gas are applied. For a melt spinning method, a known extruder such as a single-screw extruder and a twin-screw extruder can be used.

A bore diameter of a mouth ring (nozzle) in an extruder is determined as appropriate based on a relation of a fiber diameter (yarn diameter) required with an ejection rate of the extruder or a take-off speed, but preferably in a range of 0.1 to 3.0 mm. Stretching of fibers after spinning is not always necessary in any spinning method, but when stretching is made, it is stretched in 1.1-fold to 10-fold, preferably 2-fold to 8-fold. A preferred yarn diameter in the fibers is 0.5 to 40 denier. Singular fibers or composite fibers comprising the nonwoven fabric of the invention may be either a continuous filament or staple fiber, which can be selected according to a purpose of use as appropriate.

Fibers obtained are used to form a fiber aggregate called a web. Any known method can be used as a web production method and the method is not particularly limited. For example, there may be mentioned a carding method using a flat carding machine, a roller carding machine, a garneting machine and the like and a melt-blow method. A spun-bond method may be used, in which a high speed air is blown against fibers ejected from a nozzle of a spinning machine when a resin is spun, collecting fibers on a conveyer perforated perpendicularly to air flow to form a web.

A known method can be used to obtain a nonwoven fabric of the biodegradable polymer of the invention from the web thus obtained. For example, there may be mentioned a needle punch method in which the fibers are entangled with a needle, a stitch-bonding method in which the fibers are entangled with yarns, a thermal bonding method in which the fibers are adhered by heating, a chemical bonding method using an adhesive and a resin bonding method. A mass per unit area of the nonwoven fabric of the invention is preferably 1 to 50 g/m$^2$, more preferably 5 to 20 g/m$^2$.

[Use of Biodegradable Polymer]

The molded product containing the biodegradable polymer of the invention are not particularly limited in their use, but can be used, for example, as a member (parts) constituting sanitary goods, agricultural and horticultural materials, civil engineering and construction materials and the like. That is, a raw material containing the biodegradable polymer of the invention can be used to produce sanitary goods, agricultural and horticultural materials, civil engineering and construction materials and the like and the biodegradable polymer of the invention is suitable for use in sanitary goods.

The production method of sanitary goods, agricultural and horticultural materials, civil engineering and construction materials and the like includes a method to mold the resin composition containing the biodegradable polymer of the invention in a desired shape and a method to further adhere and fix the molded products with each other by a known method such as hot melt adhesion or hot gluing.

The sanitary goods include, for example, a sanitary tampon applicator, a sanitary napkin, a panty liner, a disposable diaper or a incontinence pad and the like.

An agricultural and horticultural material includes, for example, a mulch film, raising pot for seedling, horticultural tape, fruit growing bag, picket, fumigation sheet or film for a plastic greenhouse and the like.

A civil engineering and construction material includes, for example, a vegetation net, vegetation pot, three dimensional net, fabric for civil engineering, picket or heat insulation material and the like.

A nonwoven fabric containing the biodegradable polymer of the invention is suitable for use, for instance, in a surface material of a sanitary napkin, a top sheet of a panty liner, a top sheet of a disposable diaper, a fruit growing bag and the like. A film containing the biodegradable polymer of the invention is suitable for use, for instance, in a wetting prevention material for a sanitary napkin, a back sheet of a panty liner, a back sheet of a disposable diaper, a mulch film, an agricultural and horticultural tape, a film for a plastic greenhouse and the like. A vessel-shaped molded product or tubular product molded from a sheet containing the biodegradable polymer of the invention is suitable for use, for example, in a sanitary tampon applicator and the like. A vessel-shaped molded product containing the biodegradable polymer of the invention is suitable for use, for example, in a raising pot for seedling or a vegetation pot and the like.

A disposable diaper may be optionally provided with a gather around a thigh aiming at improving prevention of an absorption core from leakage and better mobility of a wearer.

EXAMPLES

The invention is more specifically described based on Examples below, but is not limited by these Examples. An evaluation method in Examples is as follows.

[1] Molecular Weight of Polymer

A molecular weight of a polymer was determined by gel permeation chromatography (referred to as "GPC" hereinafter). Polystyrene was used as a standard substance.

[2] Tensile Strength and Tensile Modulus of Film

A film test specimen punched out in a dumbbell shape was used to measure tensile stress at a pull rate of 50 mm/sec using a tension tester to determine tensile strength and tensile modulus.

[3] Water Solubility Test

A water solubility test of a film was carried out by weighing the film immersed in distilled water at 35° C. for 24 hours and dried. When a weight retention rate of the film after immersing in distilled water at 35° C. for 24 hours was 98% or higher, it was rated not to have water solubility.

[4] Water Disintegrating Test

Water disintegratability of a film was tested in distilled water (around pH 7) according to a test on defiberizability of "toilet tissue papers" in JIS P 4501. When a film or nonwoven fabric with a 11 cm square was changed to those with a 4 cm square or less at 520 hours or less, it was rated water disintegrative.

[5] Biodegradability Test

A biodegradability test of a film was carried out according to ISO 14855. When a degree of biodegradation of a film was 60% or more, it was rated biodegradable.

[6] Denier

Measurement was made according to JIS L 1015.

[7] Mass Per Unit Area

A test specimen with a 10 cm square was prepared from a sample in a normal condition and equilibrated in water content, then measured a weight (g) of the test specimen. The obtained value was converted to a value per unit area as a mass per unit area (g/m$^2$).

[8] KGSM Tensile Force

A test specimen with a length of 10 cm and a width of 5 cm was prepared according to a strip method in JIS L 1096 and stretched in a longitudinal direction (MD) and a lateral direction (CD) to convert a breaking force (kg/5 cm) obtained to a value per mass per unit area as a KGSM tensile force.

[Production of Compound Containing Imine Unit]

Production examples of a compound containing imine unit constituting biodegradable polymer are specifically described below.

Production Example 1

To a 300 mL separable flask equipped with a Dean Stark trap with a condenser, a thermometer, a glass agitation blade and a dropping funnel were added 13.4 g (0.1 mol) of terephthalaldehyde (produced by Aldrich Co., purity: 99.0%) and 120 mL of toluene, which was stirred with the glass agitation blade and chilled to 3 to 5° C. over an iced water. 12.2 g (0.2 mol) of 2-ethanolamine (produced by Wako Pure Chemical Industries, Ltd., purity, 99.0%) was added to a dropping funnel and added dropwise to the flask over 30 minutes. After dropwise addition, the mixture was heated over an oil bath to reflux until water formation was ceased. The mixture was cooled to a room temperature and then filtered to collect a precipitate on a funnel, which was washed with 120 mL of toluene. Crystals obtained were dried under a nitrogen atmosphere at 50° C. overnight to yield 21.2 g of N,N'-(1,4-phenylenedimethylidene) bis(ethanolamine) (referred to as "imine compound 1" hereinafter) as pale yellow solid. Imine compound 1 was dissolved in deuterated DMSO to measure a proton nuclear magnetic resonance spectrum ($^1$H-NMR spectrum), which was assigned as follows, confirming the formation of imine compound 1.

$^1$H-NMR spectrum: δ H 4.61 (s, 2H), δ H 3.67 (s, 8H), δ H 8.31 (s, 2H), δ H 7.71 (s, 4H).

Production Example 2

The reaction was operated similarly to Production Example 1 except that 21.46 g (0.2 mol) of 2-(aminoethoxy)ethanol (produced by Tokyo Chemical Industry Co., Ltd., purity: 98.0%) was used instead of 2-ethanolamine and the product was dried under reduced pressure at a room temperature for three days, yielding 28.3 g of N,N'-(1,4-phenylenedimethylidene) bis(2-(2-aminoethoxy)ethanol) (referred to as "imine compound 2" hereinafter) as pale yellow solids. Imine compound 2 was dissolved in deuterated DMSO to measure a proton nuclear magnetic resonance spectrum ($^1$H-NMR spectrum), which was assigned as follows, confirming the formation of imine compound 2.

$^1$H-NMR spectrum: δ H 4.58 (t, 2H), δ H 3.44 (m, 8H), δ H 3.68 (m, 8H), δ H 8.37 (s, 2H), δ H 7.79 (s, 4H).

Production Example 3

The reaction was operated similarly to Production Example 1 except that 18.5 g (0.2 mol) of hydroxyacetone (produced by Tokyo Chemical Industry Co., Ltd., purity: 80.0%) instead of terephthalaldehyde was used, yielding 28.2 g of 2-(2-hydroxyethylimino)propane-1-ol (referred to as "imino compound 3" hereinafter). Imine compound 3 was dissolved in deuterated DMSO to measure a proton nuclear magnetic resonance spectrum ($^1$H-NMR spectrum), from which imine compound 3 was confirmed to have a chemical structure of the following formula (6).

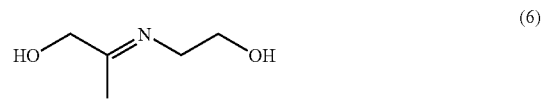

(6)

Production Example 4

The reaction was operated similarly to Production Example 1 except that 26.0 g (0.2 mol) of 2-hydroxyethyl pyruvate was used instead of terephthalaldehyde to yield 35.6 g of 2-hydroxyethyl 2-(2-hydroxyethylimino)propanoate (referred to as "imine compound 4" hereinafter). Imine compound 4 was dissolved in deuterated DMSO to measure a proton nuclear magnetic resonance spectrum ($^1$H-NMR spectrum), from which imine compound 4 was confirmed to have a chemical structure of the following formula (7).

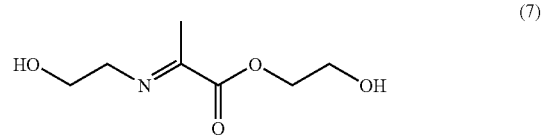

(7)

[Production of Compound Containing Biodegradable Unit]

(Production of Compound Containing Biodegradable Unit Having —COOH at Both Ends)

Specific production examples of a compound containing the biodegradable unit constituting the biodegradable polymer are described below. An acid value of the compound containing the biodegradable unit was measured in order to confirm an end point in production of the compound containing the biodegradable unit from a dibasic acid and a divalent aliphatic alcohol and determine an amount of the carboxyl group in the compound containing the biodegradable unit produced. The measurement method is given below.

<Method to Measure Acid Value>

A compound containing the biodegradable unit having the carboxyl group at both ends was dissolved in chloroform, to which a few drop of an indicator (Bromothymol Blue methanol solution) was added and titrated with a 0.05N alcoholic potassium hydroxide solution to determine the acid value according to the following formula.

Acid value(mg-KOH/g)=2.805×$f$×$V$/$S$ f: Factor of 0.05 N alcoholic potassium hydroxide solution
V: Titration volume (mL) of 0.05 N alcoholic potassium hydroxide solution
S: Amount taken from a sample of biodegradable unit having the carboxyl group at both ends.

Production Example 5

To a 1 L SUS separable flask equipped with a water quantification receiver with a condenser, a thermometer, a bent tube and a SUS agitation blade were added 202.5 g (1.71 mol) of succinic acid (produced by Wako Pure Chemical Industries, Ltd., purity: 99.5%) and 143.6 g (1.56 mol) of 1,4-butanediol (produced by Wako Pure Chemical Industries, Ltd., purity, 98.0%), the mixture was heated on an oil bath to 60° C. and then deaerated under reduced pressure for 30 minutes. After completion of deaeration, an atmosphere was switched to introduction of nitrogen and the reaction temperature was raised stepwise to 160° C. The reaction was continued at 160° C. until the reaction product indicated the acid value of 45.7 mg-KOH/g and a molten product was then discharged at the end of the reaction onto a SUS vat. 278.3 g of polybutylene succinate having the carboxyl group at both ends (referred to as "PBS1" hereinafter) was obtained. The result of measurement of the acid value of PBS1 was 45.2 mg-KOH/g. A molecular weight of PBS1 was measured by GPC to give a number average molecular weight of 3,169.

Production Example 6

The reaction was operated similarly to Production Example 5 except that an amount of succinic acid used was changed to 351.1 g (2.96 mol), an amount of 1,4-butanediol used was changed to 262.8 g (2.86 mol), a reaction temperature was raised stepwise to 180° C. and the reaction was continued at 180° C. until an acid value gave 19.0 mg-KOH/g, yielding 485.4 g of polybutylene succinate having the carboxyl group at both ends (referred to as "PBS2" hereinafter). An acid value of PBS2 was 18.4 mg-KOH/g and a number average molecular weight of PBS2 was 10,312.

Production Example 7

The reaction was operated similarly to Production Example 5 except that an amount of succinic acid used was changed to 291.0 g (2.45 mol), an amount of 1,4-butanediol used was changed to 188.5 g (2.05 mol) and the reaction was continued at 160° C. until an acid value gave 110.3 mg-KOH/g, yielding 395.3 g of polybutylene succinate having the carboxyl group at both ends (referred to as "PBS3" hereinafter). An acid value of PBS3 was 108.6 mg-KOH/g and a number average molecular weight of PBS3 was 1,420.

Production Example 8

The reaction was operated similarly to Production Example 5 except that an amount of succinic acid used was changed to 305.9 g (2.58 mol), an amount of 1,4-butanediol used was changed to 163.5 g (1.78 mol) and the reaction was continued at 160° C. until an acid value gave 224.5 mg-KOH/g, yielding 385.1 g of polybutylene succinate having the carboxyl group at both ends (referred to as "PBS4" hereinafter). An acid value of PBS4 was 221.7 mg-KOH/g and a number average molecular weight of PBS4 was 653.

Production Example 9

The reaction was operated similarly to Production Example 5 except that an amount of succinic acid used was changed to 305.9 g (2.58 mol), an amount of 1,4-butanediol used was changed to 233.3 g (2.54 mol), a reaction temperature was raised stepwise to 180° C. and the reaction was continued at 180° C. until an acid value gave 11.2 mg-KOH/g, yielding 428.8 g of polybutylene succinate having the carboxyl group at both ends (referred to as "PBS5" hereinafter). An acid value of PBS5 was 10.9 mg-KOH/g and a number average molecular weight of PBS5 was 17,400.

Production Example 10

The reaction was operated similarly to Production Example 5 except that an amount of succinic acid used was changed to 206.9 g (1.74 mol), an amount of 1,4-butanediol used was changed to 106.5 g (1.12 mol), 51.2 g (0.48 mol) of diethylene glycol (produced by Wako Pure Chemical Industries, Ltd., purity: 99.0%) was further used and the reaction was continued until an acid value gave 46.6 mg-KOH/g, yielding 282.6 g of a copolymer of succinic acid-1,4-butanediol-diethylene glycol having the carboxyl group at both ends (referred to as "PBDEGS" hereinafter). An acid value of PBDEGS was 45.5 mg-KOH/g and a number average molecular weight of PBDEGS was 2,858.

(Production of Compound Containing Biodegradable Unit Having —OH at Both Ends)

Specific Production examples of a compound containing the biodegradable unit constituting the biodegradable polymer are described below. A hydroxyl value of the compound containing the biodegradable unit was measured in order to confirm an end point in Production of the compound containing the biodegradable unit from a dibasic acid and a divalent aliphatic alcohol and determine an amount of the hydroxyl group in the compound containing the biodegradable unit produced. A measurement method is given below.

<Method to Measure Acetyl Value>

An acetylating agent was prepared from 400 mL of chloroform (produced by Wako Pure Chemical Industries, Ltd., reagent grade), 4 g of 70% perchloric acid (produced by Wako Pure Chemical Industries, Ltd., highest grade) and 50 mL of acetic anhydride (produced by Wako Pure Chemical Industries, Ltd., highest grade).

A compound containing the biodegradable unit having the hydroxyl group at both ends was acetylated with this acetylating agent, to which more than a dozen drops of Cresol Red-Thymol Blue mixed indicator was added and titrated with a 0.5 N alcoholic sodium hydroxide solution. A blank run was also carried out. An acetyl value was calculated from these titration results by the following formula.

Acetyl value(mg-KOH/g)=$(V_0-V_1) \times f \times 28.05/S$ f: Factor of 0.5N alcoholic sodium hydroxide solution $V_0$: Titration volume (mL) of 0.5N alcoholic sodium hydroxide solution required for a blank run $V_1$: Titration volume (mL) of 0.5N alcoholic sodium hydroxide solution required for a test of the sample compound containing the biodegradable unit having the hydroxyl group at both ends S: Collection quantity (g) of the sample compound containing the biodegradable unit having the hydroxyl group at both ends <Method to Measure Acid Value>

A compound containing the biodegradable unit having the hydroxyl group at both ends was dissolved in a mixed solvent of chloroform and methanol, to which a few drops of Bromothymol Blue-Phenol Red mixed indicator was added and titrated with a 0.1N alcoholic potassium hydroxide. A blank run was also carried out. From these titration results, an acid value was calculated by the following formula.

Acid value(mg-KOH/g)=$(V_1-V_0) \times f \times 5.61/S$ f: Factor of 0.1N alcoholic potassium hydroxide solution $V_0$: Titration volume (mL) of 0.1N alcoholic potassium hydroxide solution required for a blank run $V_1$: Titration volume (mL) of 0.1N alcoholic potassium hydroxide solution required for a test sample of a compound containing the biodegradable unit having the hydroxyl group at both ends S: Collection quantity (g) of the sample compound containing the biodegradable unit having the hydroxyl group at both ends <Method to Determine Hydroxyl Value>

A hydroxyl value was evaluated by the following formula.

Hydroxyl Value(mg-KOH/g)=Acetyl Value+Acid Value

Production Example 11

To a 1 L glass separable flask equipped with a water quantification receiver with a condenser, a thermometer, a bent tube and a SUS agitation blade were added 320.4 g (2.70 mol) of succinic acid and 303.5 g (3.30 mol) of 1,4-butanediol to heat stepwise under a nitrogen stream to 180° C. When water formation at 180° C. was hardly observed, 1.32 g of a 1% tin (II) 2-ethylhexylhexanoate toluene solution (tin (II) 2-ethylhexanoate, 0.033 mol, produced by Wako Pure Chemical Industries, Ltd.) was added to the reaction mixture to continue the reaction. The reaction temperature was raised to 200° C. to continue the reaction until the hydroxyl value and acid value of the reaction product gave 57.6 mg-KOH/g and 0.3 mg-KOH/g, respectively and the molten product at end of the reaction was then discharged onto a SUS vat. 434.4 g of polybutylene succinate having the hydroxyl group at both ends (referred to as "PBS6" hereinafter) was obtained. The hydroxyl value and acid value of PBS6 were measured to give the hydroxyl value of 57.5 mg-KOH and the acid value of 0.2 mg-KOH/g, respectively. A molecular weight of PBS6 measured by GPC gave a number average molecular weight of 1,951.

Production Example 12

The reaction was operated similarly to Production Example 11 except that an amount of succinic acid used was changed to 288.4 g (2.43 mol), and 39.7 g (0.27 mol) of adipic acid (produced by Wako Pure Chemical Industries, Ltd., purity: 99.5%) was further used and the reaction was continued until a hydroxyl value and an acid value gave 57.7 mg-KOH/g and 0.4 mg-KOH/g, respectively, yielding 480.7 g of polybutylene succinate adipate having the carboxyl group at both ends (referred to as "PBSA diol" hereinafter). A hydroxyl value and an acid value of PBSA diol were measured to give 57.6 mg-KOH/g for the hydroxyl value and 0.3 mg-KOH/g for the acid value, respectively. A molecular weight of PBSA diol was measured by GPC to give a number average molecular weight of 1,947.

Example 1

To a 500 mL four-necked flask equipped with a condenser, a thermometer and an agitation blade were added 50.0 g (carboxyl group: 40.3 mmol) of PBS1, 22.9 g (120.9 mmol) of tributylamine (produced by Wako Pure Chemical Industries, Ltd., purity: 98.0%) and 350 mL of dried dichloromethane to dissolve with stirring under a nitrogen atmosphere. Next, 15.76 g (60.5 mmol) of 2-chloro-1-methylpyridinium iodide (produced by Tokyo Chemical Industry Co., Ltd., purity, 98.0%) was added to the reaction mixture, which was allowed to stand for 15 minutes and then 4.44 g (20.2 mmol) of imine compound 1 was added. The reaction was conducted at 40 to 42° C. under nitrogen atmosphere for 12 hours. After reaction, the reaction mixture was cooled to a room temperature and added dropwise to 1400 mL of dried methanol under nitrogen atmosphere to precipitate a flocculent polymer. This suspension was pressure-filtered with nitrogen to isolate the polymer, which was dried at 30° C. under nitrogen atmosphere overnight. A dried polymer was added to 1400 mL of dried methanol and stirred under nitrogen atmosphere to wash and filter under pressure. Similar washing operation was repeated and dried at 50° C. under nitrogen atmosphere overnight. 51.5 g of polybutylene succinate having an imine bond (referred to as "imine containing PBS" hereinafter) was obtained. A molecular weight of imine containing PBS obtained was measured by GPC to give a number average molecular weight of 26,984. Its $^1$H-NMR spectrum was measured to find a methine peak at 8.29 ppm to confirm the presence of the imine bond in imine containing PBS. Results of analysis of $^1$H-NMR spectrum suggested that it has a chemical structure of the following formula (8).

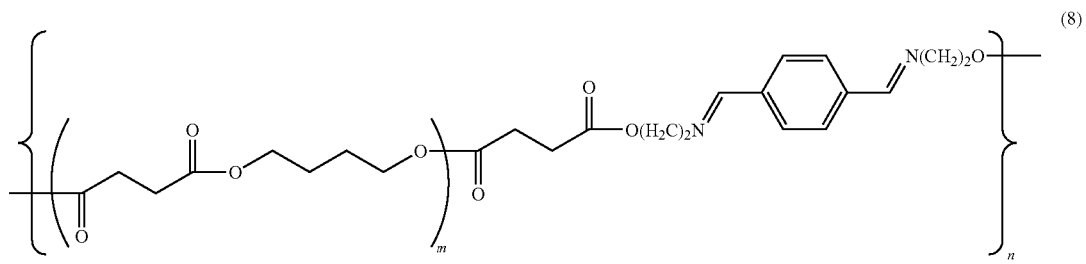

(8)

Imine containing PBS obtained was heat-pressed at 115° C. for 3 minutes to prepare a film with a thickness of 15 μm, 30 μm and 100 μm, respectively. Tensile strength and tensile modulus of the film with a thickness of 100 μm were 25.5 MPa and 687 MPa, respectively. This film was excellent in both appearance and the sense of touch, and soft, and strong in strength.

A water solubility test was performed with a film with a thickness of 100 μm. As a result, a weight retention rate of the film was 99.7%, which confirms that this film did not have water solubility. A film with a thickness of 15 μm was also used to test the water disintegratability. As a result, a film with a 11 cm square disintegrated into a 1 to 2 cm square after 119 hours and the number average molecular weight at the time was reduced to 12,700. A film with a thickness of 30 μm was also used to test the biodegradability, resulting in a degree of biodegradability to be 32.5% after one week, 66.4% after two weeks, 81.0% after three weeks and 92.3% after four weeks.

Example 2

The reaction was operated similarly to Example 1 except that an amount of tributylamine used was changed to 18.3 g (96.7 mmol) and an amount of 2-chloro-1-methylpyridinium iodide used was changed to 12.6 g (48.4 mmol) to obtain 51.4 g of flocculated imine containing PBS. A molecular weight of imine containing PBS obtained was measured by GPC to give a number average molecular weight of 26,035. A structure of imine containing PBS was similarly confirmed as Example 1 and a chemical structure similar to Example 1 was also confirmed.

Imine containing PBS obtained was used to prepare a film similarly to Example 1. Tensile strength and tensile modulus of the film with a thickness of 100 µm were 24.5 MPa and 678 MPa, respectively. This film was excellent in both appearance and the sense of touch, and soft, and strong in strength.

A water solubility test was performed with a film with a thickness of 100 µm. As a result, a weight retention rate of the film was 99.8%, which confirms that this film did not have water solubility. A film with a thickness of 15 µm was also used to test the water disintegratability. As a result, a film with a 11 cm square disintegrated into a 1 to 2 cm square after 118.9 hours and the number average molecular weight at the time was reduced to 11,566. A film with a thickness of 30 µm was also used to test the biodegradability, resulting in a degree of biodegradability to be 32.7% after one week, 66.8% after two weeks, 81.2% after three weeks and 92.5% after four weeks.

Example 3

The reaction was operated similarly to Example 1 except that an amount of tributylamine used was changed to 38.1 g (201.5 mmol) and an amount of 2-chloro-1-methylpyridinium iodide used was changed to 26.3 g (100.8 mmol) to obtain 51.6 g of flocculated imine containing PBS. A molecular weight of imine containing PBS obtained was measured by GPC to give a number average molecular weight of 31,391. A structure of imine containing PBS was similarly confirmed as Example 1 and a chemical structure similar to Example 1 was also confirmed.

Imine containing PBS obtained was used to prepare a film similarly to Example 1. Tensile strength and tensile modulus of the film with a thickness of 100 µm were 25.6 MPa and 680 MPa, respectively. This film was excellent in both appearance and the sense of touch, and soft, and strong in strength.

A water solubility test was performed with a film with a thickness of 100 µm. As a result, a weight retention rate of the film was 99.6%, which confirms that this film did not have water solubility. A film with a thickness of 15 µm was also used to test the water disintegratability. As a result, a film with a 11 cm square disintegrated into a 1 to 2 cm square after 118.7 hours and the number average molecular weight at the time was reduced to 11,077. A film with a thickness of 30 µm was also used to test the biodegradability, resulting in a degree of biodegradability to be 32.4% after one week, 66.3% after two weeks, 80.9% after three weeks and 91.8% after four weeks.

Example 4

The reaction was operated similarly to Example 1 except that 50.0 g of PBS2 (carboxyl group: 16.4 mmol) was used instead of PBS1, an amount of tributylamine used was changed to 9.31 g (49.2 mmol), an amount of 2-chloro-1-methylpyridinium iodide used was changed to 6.41 g (24.6 mmol) and an amount of imine compound 1 used was changed to 1.80 g (8.20 mmol) to obtain 49.5 g of flocculated imine containing PBS. A molecular weight of imine containing PBS obtained was measured by GPC to give a number average molecular weight of 30,686. A structure of imine containing PBS was confirmed similarly to Example 1 and a chemical structure similar to Example 1 was also confirmed.

Imine containing PBS obtained was used to prepare a film similarly to Example 1. Tensile strength and tensile modulus of the film with a thickness of 100 µm were 37.7 MPa and 779 MPa, respectively. This film was excellent in both appearance and the sense of touch, and soft, and strong in strength.

A water solubility test was performed with a film with a thickness of 100 µm. As a result, a weight retention rate of the film was 99.8%, which confirms that this film did not have water solubility. A film with a thickness of 15 µm was also used to test the water disintegratability. As a result, a film with a 11 cm square disintegrated into a 2 to 3 cm square after 240 hours and the number average molecular weight was reduced to 14,400. A film with a thickness of 30 µm was also used to test the biodegradability, resulting in a degree of biodegradability to be 28.5% after one week, 58.6% after two weeks, 77.3% after three weeks and 89.7% after four weeks.

Example 5

The reaction was operated similarly to Example 1 except that 50.0 g of PBS3 (carboxyl group: 96.8 mmol) was used instead of PBS1, an amount of tributylamine used was changed to 54.9 g (290.4 mmol), an amount of 2-chloro-1-methylpyridinium iodide used was changed to 35.9 g (145.2 mmol) and an amount of imine compound 1 used was changed to 10.6 g (48.4 mmol) to obtain 57.1 g of flocculated imine containing PBS. A molecular weight of imine containing PBS obtained was measured by GPC to give a number average molecular weight of 31,391. A structure of imine containing PBS was similarly confirmed as Example 1 and a chemical structure similar to Example 1 was also confirmed.

Imine containing PBS obtained was used to prepare a film similarly to Example 1. Tensile strength and tensile modulus of the film with a thickness of 100 µm were 20.7 MPa and 677 MPa, respectively. This film was excellent in both appearance and the sense of touch, and soft, and strong in strength.

A water solubility test was performed with a film with a thickness of 100 µm. As a result, a weight retention rate of the film was 98.7%, which confirms that this film did not have water solubility. A film with a thickness of 15 µm was also used to test the water disintegratability. As a result, a film with a 11 cm square disintegrated into a 1 to 2 cm square after 8 hours and the number average molecular weight at the time was reduced to 7,245. A film with a thickness of 30 µm was also used to test the biodegradability, resulting in a degree of biodegradability to be 40.5% after one week, 77.5% after two weeks, 87.6% after three weeks and 95.3% after four weeks.

Example 6

The reaction was operated similarly to Example 1 except that 50.0 g of PBS4 (carboxyl group: 197.6 mmol) was used instead of PBS1, an amount of tributylamine used was changed to 112.1 g (592.8 mmol), an amount of 2-chloro-1-methylpyridinium iodide used was changed to 77.3 g (296.4 mmol) and an amount of imine compound 1 used was changed to 21.7 g (98.8 mmol) to obtain 68.2 g of flocculated imine containing PBS. A molecular weight of imine containing PBS obtained was measured by GPC to give a number average molecular weight of 32,501. A structure of imine containing PBS was confirmed similarly to Example 1 and a chemical structure similar to Example 1 was also confirmed.

Imine containing PBS obtained was used to prepare a film similarly to Example 1. Tensile strength and tensile modulus of the film with a thickness of 100 µm were 20.1 MPa and 595 MPa, respectively. This film was excellent in both appearance and the sense of touch, and soft, and strong in strength.

A water solubility test was performed with a film with a thickness of 100 µm. As a result, a weight retention rate of the film was 98.6%, which confirms that this film did not have water solubility. A film with a thickness of 15 µm was also used to test the water disintegratability. As a result, a film with a 11 cm square disintegrated into a 1 to 2 cm square after 2 hours and the number average molecular weight at the time was reduced to 5,490. A film with a thickness of 30 µm was also used to test the biodegradability, resulting in a degree of biodegradability to be 46.3% after one week, 80.0% after two weeks, 90.0% after three weeks and 96.0% after four weeks.

Example 7

The reaction was operated similarly to Example 1 except that 50.0 g of PBS5 (carboxyl group: 9.71 mmol) was used instead of PBS1, an amount of tributylamine used was changed to 5.50 g (29.1 mmol), an amount of 2-chloro-1-methylpyridinium iodide used was changed to 3.81 g (14.6 mmol) and an amount of imine compound 1 used was changed to 1.07 g (4.86 mmol) to obtain 49.4 g of imine containing PBS. A molecular weight of imine containing PBS obtained was measured by GPC to give a number average molecular weight of 27,443. A structure of imine containing PBS was confirmed similarly to Example 1 and a chemical structure similar to Example 1 was also confirmed.

Imine containing PBS obtained was used to prepare a film similarly to Example 1. Tensile strength and tensile modulus of the film with a thickness of 100 µm were 38.9 MPa and 790 MPa, respectively. This film was excellent in both appearance and the sense of touch, and soft, and strong in strength.

A water solubility test was performed with a film with a thickness of 100 µm. As a result, a weight retention rate of the film was 99.8%, which confirms that this film did not have water solubility. A film with a thickness of 15 µm was also used to test the water disintegratability. As a result, a film with a 11 cm square disintegrated into a 3 to 4 cm square after 520 hours and the number average molecular weight at the time was reduced to 15,460. A film with a thickness of 30 µm was also used to test the biodegradability, resulting in a degree of biodegradability to be 28.0% after one week, 53.6% after two weeks, 72.5% after three weeks and 85.5% after four weeks.

Example 8

The reaction was operated similarly to Example 1 except that 50.0 g of PBDEGS (carboxyl group: 40.6 mmol) was used instead of PBS1, an amount of tributylamine used was changed to 16.8 g (121.8 mmol), an amount of 2-chloro-1-methylpyridinium iodide used was changed to 15.9 g (60.9 mmol) and an amount of imine compound 1 used was changed to 4.5 g (20.3 mmol) to obtain 50.1 g of imine containing PBDEGS. A molecular weight of imine containing PBDEGS obtained was measured by GPC to give a number average molecular weight of 36,700. A structure of imine containing PBDEGS was analyzed similarly to Example 1, suggesting a chemical structure of the following formula (9).

Imine containing PBDEGS obtained was used to prepare a film similarly to Example 1. Tensile strength and tensile modulus of the film with a thickness of 100 µm were 30.9 MPa and 520 MPa, respectively. This film was excellent in both appearance and the sense of touch, and soft, and strong in strength.

A water solubility test was performed with a film with a thickness of 100 µm. As a result, a weight retention rate of the film was 99.8%, which confirms that this film did not have water solubility. A film with a thickness of 15 µm was also used to test the water disintegratability. As a result, a film with a 11 cm square disintegrated into a 1 mm to 1 cm square after 206 hours and the number average molecular weight at the time was reduced to 12,800. A film with a thickness of 30 µm was also used to test the biodegradability, resulting in a degree of biodegradability to be 30.2% after one week, 64.5% after two weeks, 79.0% after three weeks and 89.7% after four weeks.

Comparative Example 1

The reaction was operated similarly to Example 4 except that 0.753 g (8.20 mmol) of 1,4-butanediol was used instead of imine compound 1 to obtain 49.7 g of flocculated polybutylene succinate. A molecular weight of polybutylene succinate obtained was measured by GPC to give a number average molecular weight of 34,465.

Polybutylene succinate obtained was used to prepare a film similarly to Example 1. Tensile strength and tensile modulus of the film with a thickness of 100 µm were 39.3 MPa and 371 MPa, respectively. This film was excellent in both appearance and the sense of touch, and soft, and strong in strength.

A water solubility test was performed with a film with a thickness of 100 µm. As a result, a weight retention rate of the film was 99.8%, which confirms that this film did not have water solubility. The film described above was used to test the water disintegratability. As a result, a film did not disintegrated after 520 hours. This film at the time further had a number average molecular weight of 33,531 and no change of a molecular weight was observed. A similar film was also used to test the biodegradability, resulting in a degree of biodegradability to be 27.0% after one week, 52.5% after two weeks, 69.0% after three weeks and 79.0% after four weeks, resulting in lower biodegradability than imine containing PBS.

Example 9

To a 200 mL glass separable flask equipped with a condenser, a thermometer and an agitation blade were added 100.0 g of PBS6 (hydroxyl group: 0.102 mol) and 11.3 g of imine compound 1 (hydroxyl group: 0.102 mol). After a mixture was melted at 130° C. under nitrogen atmosphere,

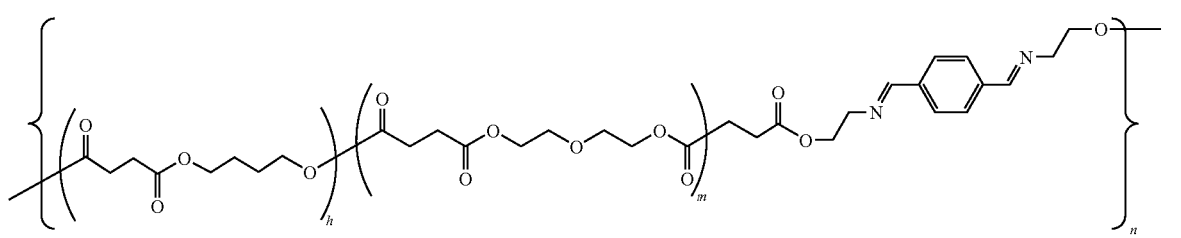

(9)

0.89 g of 1% dibutyltin (IV) dilaurate toluene solution (dibutyltin (IV) dilaurate: 0.014 mmol, produced by Wako Pure Chemical Industries, Ltd., purity: 99.0%) was added. Next, 16.5 g of hexamethylenediisocyante (referred to as "HDI" hereinafter) (isocyanate group: 0.195 mol; Takenate 700 produced by Mitsui Chemicals Polyurethanes., Ltd.; NCO content: 49.6% by weight) was added dropwise over 10 minutes and HDI remained in a dropping funnel was rinsed with 1.3 g of toluene. After the reaction was then continued at 130° C. under nitrogen atmosphere for 3 hours, a molten polymer was discharged onto a stainless vat to yield 101.0 g of imine containing PBS. A molecular weight of an imine containing PBS obtained was measured by GPC to give a number average of molecular weight of 26,984. Its $^1$H-NMR spectrum was measured to observe a methine peak of the imine bond at 8.29 ppm to confirm the presence of imine bond in imine containing PBS. Analytical results of the $^1$H-NMR spectrum suggest that it has a chemical structure of the following formula (10).

reduced to 15,800. A film with a thickness of 100 μm was also used to measure a tensile strength change with time after immersion in water, resulting in reduction of the tensile strength to 12.2 MPa after immersion in water for 2 hours. FIG. 1 demonstrates the results of a tensile strength change with time after immersion in water. A film with a thickness of 30 μm was also used to test the biodegradability, resulting in a degree of biodegradability to be 15.3% after one week, 27.5% after two weeks, 40.8% after three weeks, 52.3% after four weeks and 60.0% after five weeks.

Example 10

The reaction was operated similarly to Example 9 except that 100.0 g of polybutylene adipate diol (referred to as "PBA diol" hereinafter) (hydroxyl group: 0.100 mol, Takelac

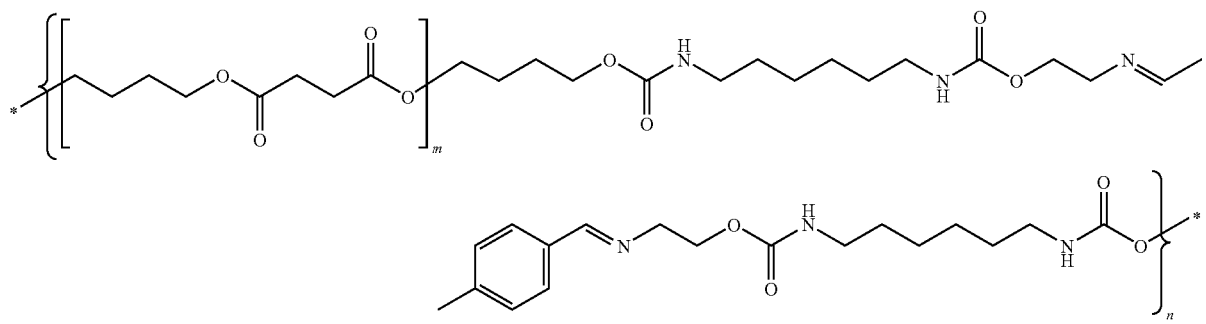

(10)

Imine containing PBS obtained was heat-pressed at 130° C. for 5 minutes to prepare a film with a thickness of 15 μm, 30 μm and 100 μm, respectively. Tensile strength and tensile modulus of the film with a thickness of 100 μm were 31.9 MPa and 832 MPa, respectively. This film was excellent in both appearance and the sense of touch, and soft, and strong in strength.

A water solubility test was performed using a film with a thickness of 100 μm. As a result, a weight retention rate of the film was 99.8%, which confirms that this film did not have water solubility. A film with a thickness of 15 μm was used to test the water disintegratability. As a result, a film with a 11 cm square disintegrated into a 1 to 2 cm square after 259 hours and the number average molecular weight at the time was U-2420 produced by Mitsui Chemicals Polyurethanes, Ltd., hydroxyl value: 56.1 mg-KOH/g) was used instead of PBS6, an amount of imine compound 1 used was changed to 11.0 g (hydroxyl group: 0.100 mol) and an amount of HDI used was changed to 16.1 g (isocyanate group: 0.190 mol) to obtain 115.1 g of polybutylene adipate having an imine bond (referred to as "imine containing PBA" hereinafter). A molecular weight of imine containing PBA was measured by GPC to give a number average molecular weight of 34,850. Its $^1$H-NMR spectrum was measured to observe a methine peak of the imine bond at 8.29 ppm to confirm the presence of imine bond in imine containing PBA. Analytical results of the $^1$H-NMR spectrum suggest that it has a chemical structure of the following formula (11).

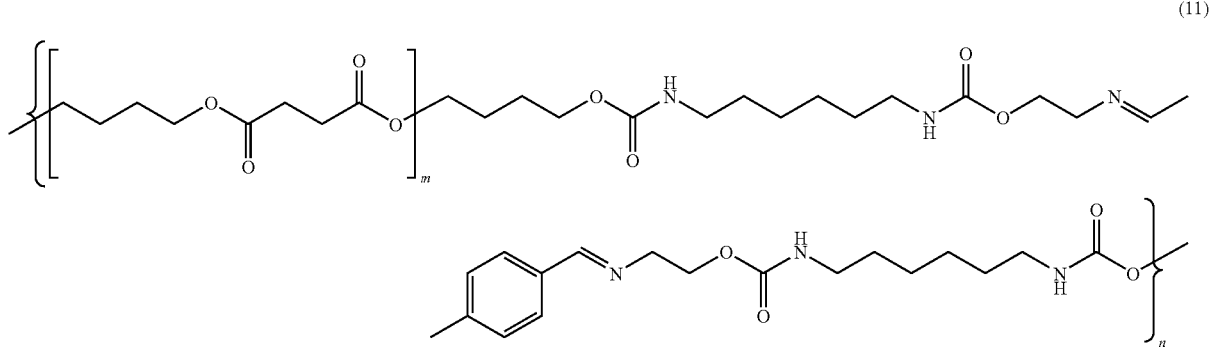

(11)

The imine containing PBA obtained was used to prepare a film similarly to Example 9. Tensile strength and tensile modulus of the film with a thickness of 100 μm were 30.9 MPa and 520 MPa, respectively. This film was excellent in both appearance and the sense of touch, and soft, and strong in strength.

A water solubility test was performed using a film with a thickness of 100 μm. As a result, a weight retention rate of the film was 99.8%, which confirms that this film did not have water solubility. A film with a thickness of 15 μm was also used to test the water disintegratability. As a result, a film with a 11 cm square disintegrated into a 1 to 2 cm square after 3 hours and the number average molecular weight at the time was reduced to 12,930. A film with a thickness of 100 μm was also used to measure a tensile strength change with time after immersion in water, leading reduction of the tensile strength to 7.1 MPa after immersion in water for 2 hours. FIG. 1 demonstrates the results of a tensile strength change with time after immersion in water. A film with a thickness of 30 μm was also used to test the biodegradability, resulting in a degree of biodegradability to be 20.0% after one week, 31.5% after two weeks, 48.3% after three weeks and 61.2% after four weeks.

Example 11

The reaction was operated similarly to Example 9 except that 15.8 g of imine compound 2 (hydroxyl group: 0.102 mol) was used instead of imine compound 1 to obtain 95.3 g of imine containing PBS. A molecular weight of imine containing PBS obtained was measured by GPC to give a number average molecular weight of 30,240. Its $^1$H-NMR spectrum was measured to observe a methine peak of the imine bond at 8.29 ppm to confirm the presence of the imine bond in imine containing PBS. Analytical results of the $^1$H-NMR spectrum suggest that it has a chemical structure of the following formula (12).

The imine containing PBS obtained was used to prepare a film similarly to Example 9. Tensile strength and tensile modulus of the film with a thickness of 100 μm were 29.9 MPa and 785 MPa, respectively. This film was excellent in both appearance and the sense of touch, and soft, and strong in strength.

A water solubility test was performed using a film with a thickness of 100 μm. As a result, a weight retention rate of the film was 99.7%, which confirms that this film did not have water solubility. A film with a thickness of 15 μm was also used to test the water disintegratability. As a result, a film with a 11 cm square disintegrated into a 1 to 2 cm square after 86 hours and the number average molecular weight at the time was reduced to 15,870. A film with a thickness of 30 μm was also used to test the biodegradability, resulting in a degree of biodegradability to be 17.4% after one week, 30.6% after two weeks, 45.5% after three weeks, 58.3% after four weeks and 63.9% after five weeks.

Example 12

The reaction was operated similarly to Example 10 except that 15.4 g of imine compound 2 (hydroxyl group: 0.100 mol) was used instead of imine compound 1 to obtain 102.3 g of imine containing PBA. A molecular weight of imine containing PBA obtained was measured by GPC to give a number average molecular weight of 34,200. Its $^1$H-NMR spectrum was measured to observe a methine peak of the imine bond at 8.29 ppm to confirm the presence of the imine bond in imine containing PBA. Analytical results of the $^1$H-NMR spectrum suggest that it has a chemical structure of the following formula (13).

(12)

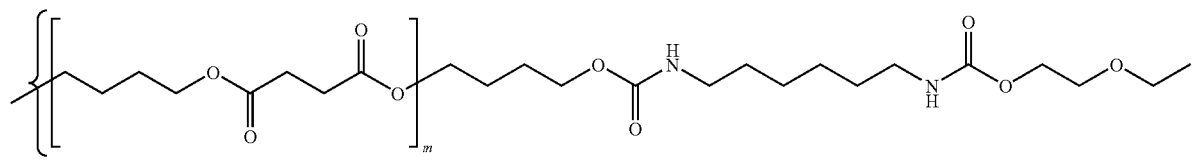

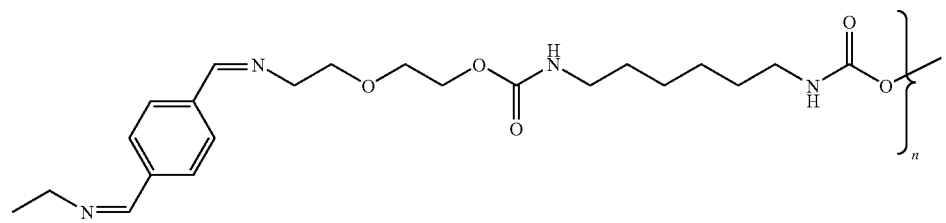

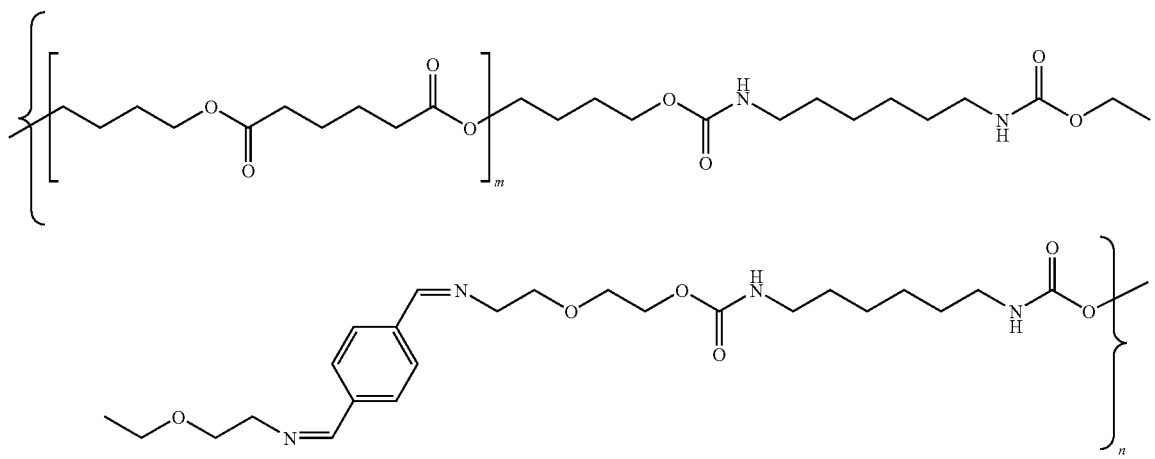

(13)

The imine containing PBA obtained was used to prepare a film similarly to Example 9. Tensile strength and tensile modulus of the film with a thickness of 100 μm were 29.3 MPa and 480 MPa, respectively. This film was excellent in both appearance and the sense of touch, and soft, and strong in strength.

A water solubility test was performed using a film with a thickness of 100 μm. As a result, a weight retention rate of the film was 99.8%, which confirms that this film did not have water solubility. A film with a thickness of 15 μm also was used to test the water disintegratability. As a result, a film with a 11 cm square disintegrated into a 1 to 2 cm square after 2 hours and the number average molecular weight at the time was reduced to 11,950. A film with a thickness of 30 μm was also used to test the biodegradability, resulting in a degree of biodegradability to be 33.0% after one week, 45.4% after two weeks, 59.3% after three weeks and 75.6% after four weeks.

Comparative Example 2

The reaction was operated similarly to Example 9 except that imine compound 1 was not used and an amount of HDI used was changed to 8.2 g (isocyanate group: 0.097 mol) to obtain 80.5 g of PBS. A molecular weight of PBS obtained was measured by GPC to give a number average molecular weight of 24,150.

PBS obtained was used to prepare a film similarly to Example 9. Tensile strength and tensile modulus of the film with a thickness of 100 μm were 67.4 MPa and 455 MPa, respectively. This film was excellent in both appearance and the sense of touch, and soft, and strong in strength.

A water solubility test was performed using a film with a thickness of 100 μm. As a result, a weight retention rate of the film was 99.6%, which confirms that this film did not have water solubility. A film with a thickness of 15 μm was also used to test the water disintegratability, but its water disintegration was not observed. A film with a thickness of 30 μm was also used to test the biodegradability, resulting in a degree of biodegradability to be 5.2% after one week, 15.7% after two weeks, 23.6% after three weeks, 37.7% after four weeks and 46.8% after five weeks, inferior to imine containing PBS in biodegradability.

Comparative Example 3

The reaction was operated similarly to Example 9 except that imine compound 1 was not used, 100.0 g of PBA diol (hydroxyl group: 0.100 mol) was used instead of PBS6 and an amount of HDI used was changed to 8.0 g (isocyanate group: 0.095 mol) to obtain 91.6 g of polybutylene adipate (referred to as "PBA" hereinafter). A molecular weight of PBA obtained was measured by GPC to give a number average molecular weight of 45,450.

PBA obtained was used to prepare a film similarly to Example 9. Tensile strength and tensile modulus of the film with a thickness of 100 μm were 72.5 MPa and 250 MPa, respectively. This film was excellent in both appearance and the sense of touch, and soft, and strong in strength.

A water solubility test was performed using a film with a thickness of 100 μm. As a result, a weight retention rate of the film was 99.7%, which confirms that this film did not have water solubility. A film with a thickness of 15 μm was also used to test the water disintegratability, but its water disintegration was not observed. A film with a thickness of 30 μm was also used to test the biodegradability, resulting in a degree of biodegradability to be 10.1% after one week, 16.0% after two weeks, 25.2% after three weeks and 40.3% after four weeks, inferior to imine containing PBA in biodegradability.

Example 13

The reaction was operated similarly to Example 9 except that 50.0 g of PBS6 (hydroxyl group: 0.051 mol) and 50 g of PBA diol (hydroxyl group: 0.050 mol) were used instead of PBS6, an amount of imine compound 1 used was changed to 11.1 g (hydroxyl group: 0.101 mol) and an amount of HDI used was changed to 16.3 g (isocyanate group: 0.192 mol) to obtain 112.5 g of polybutylene adipate-polybutylene succinate copolymer having an imine bond (referred to as "imine containing PBA-PBS" hereinafter). A molecular weight of imine containing PBA-PBS was measured by GPC to give a number average molecular weight of 41,200. Its $^1$H-NMR spectrum was also measured to observe a methine peak of the imine bond at 8.29 ppm to confirm the presence of the imine bond in imine containing PBA-PBS. Analytical results of the $^1$H-NMR spectrum suggest that it has a chemical structure of the following formula (14).

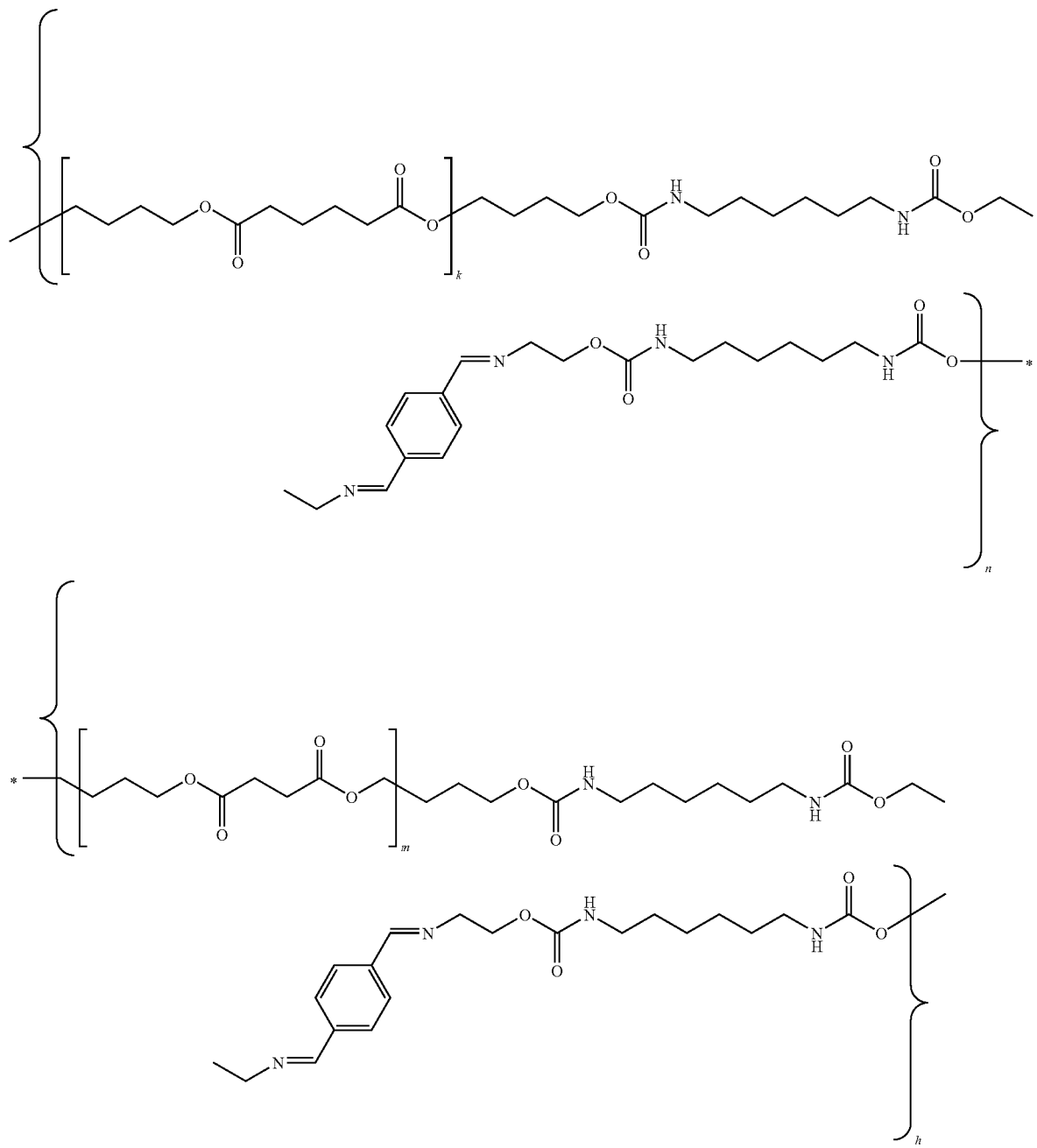

Imine containing PBA-PBS obtained was used to prepare a film similarly to Example 9. Tensile strength and tensile modulus of the film with a thickness of 100 μm were 20.9 MPa and 630 MPa, respectively. This film was excellent in both appearance and the sense of touch, and soft, and strong in strength.

A water solubility test was performed using a film with a thickness of 100 μm. As a result, a weight retention rate of the film was 99.8%, which confirms that this film did not have water solubility. A film with a thickness of 15 μm was also used to test the water disintegratability. As a result, a film with a 11 cm square disintegrated into a 1 to 2 cm square after 200 hours and the number average molecular weight at the time was reduced to 12,930. A film with a thickness of 30 μm was also used to test the biodegradability, resulting in a degree of biodegradability to be 25.3% after one week, 38.5% after two weeks, 50.7% after three weeks and 61.3% after four weeks.

Comparative Example 4

The reaction was operated similarly to Example 13 except that imine compound 1 was not used and an amount of HDI used was changed to 8.1 g (isocyanate group: 0.096 mol) to obtain 81.6 g of polybutylene adipate-polybutylene succinate copolymer (referred to as "PBA-PBS" hereinafter). A molecular weight of PBA-PBS obtained was measured by GPC to give a number average molecular weight of 30,650.

PBA-PBS obtained was used to prepare a film similarly to Example 9. Tensile strength and tensile modulus of the film with a thickness of 100 μm were 69.1 MPa and 389 MPa, respectively. This film was excellent in both appearance and the sense of touch, and soft, and strong in strength.

A water solubility test was performed using a film with a thickness of 100 μm. As a result, a weight retention rate of the film was 99.7%, which confirms that this film did not have water solubility. A film with a thickness of 15 μm was also used to test the water disintegratability, but its water disintegration was not observed. A film with a thickness of 30 μm was also used to test the biodegradability, resulting in a degree of biodegradability to be 8.3% after one week, 16.3% after two weeks, 30.9% after three weeks and 50.7% after four weeks, inferior to imine containing PBS in biodegradability.

Example 14

The reaction was operated similarly to Example 9 except that 100.0 g of PBA diol (hydroxyl group: 0.100 mol) and 4.6 g of butanediol (hydroxyl group: 0.100 mol) were used instead of PBS6, an amount of imine compound 1 used was changed to 22.0 g (hydroxyl group: 0.200 mol) and an amount of HDI used was changed to 32.2 g (isocyanate group: 0.380 mol) to obtain 90.5 g of polybutylene adipate-butanediol copolymer having an imine bond (referred to as "imine containing PBA-BD" hereinafter). A molecular weight of imine containing PBA-BD was measured by GPC to give a number average molecular weight of 20,530. Its $^1$H-NMR spectrum was also measured to observe a methine peak of the imine bond at 8.29 ppm to confirm the presence of the imine bond in imine containing PBA-BD. Analytical results of the $^1$H-NMR spectrum suggest that it has a chemical structure of the following formula (15).

MPa and 753 MPa, respectively. This film was excellent in both appearance and the sense of touch, and soft, and strong in strength.

A water solubility test was performed using a film with a thickness of 100 μm. As a result, a weight retention rate of the film was 99.9%, which confirms that this film did not have water solubility. A film with a thickness of 15 μm was also used to test the water disintegratability. As a result, a film with a 11 cm square disintegrated into a 4 cm square after 520 hours and the number average molecular weight at the time was reduced to 11,050. A film with a thickness of 30 μm was also used to test the biodegradability, resulting in a degree of biodegradability to be 10.7% after one week, 21.8% after two weeks, 35.7% after three weeks, 49.3% after four weeks, 55% after five weeks and 62.3% after six weeks.

Comparative Example 5

The reaction was operated similarly to Example 14 except that imine compound 1 was not used and an amount of HDI used was changed to 16.1 g (isocyanate group: 0.190 mol) to obtain 81.6 g of polybutylene adipate-butanediol copolymer (referred to as "PBA-BD" hereinafter). A molecular weight of PBA-BD obtained was measured by GPC to give a number average molecular weight of 31,450.

PBA-BD obtained was used to prepare a film similarly to Example 9. Tensile strength and tensile modulus of the film with a thickness of 100 μm were 75.3 MPa and 544 MPa, respectively. This film was excellent in both appearance and the sense of touch, and soft, and strong in strength.

A water solubility test was performed using a film with a thickness of 100 μm. As a result, a weight retention rate of the film was 99.7%, which confirms that this film did not have water solubility. A film with a thickness of 15 μm was also used to test the water disintegratability, but its water disintegration was not observed. A film with a thickness of 30 μm

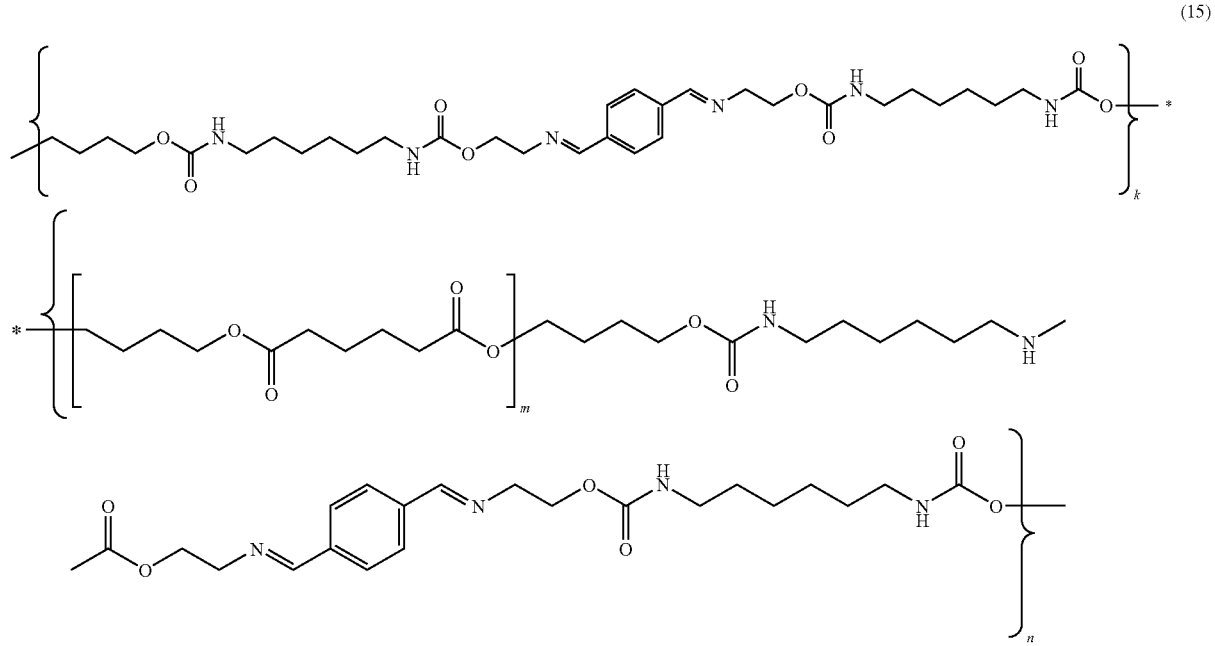

(15)

Imine containing PBA-BD obtained was used to prepare a film similarly to Example 9. Tensile strength and tensile modulus of the film with a thickness of 100 μm were 40.9 was also used to test the biodegradability, resulting in a degree of biodegradability to be 3.4% after one week, 7.1% after two weeks, 18.4% after three weeks, 26.8% after four weeks, 38.5% after five weeks and 45.8% after six weeks, inferior to imine containing PBA-BD in biodegradability.

Example 15

The reaction was operated similarly to Example 9 except that 100.0 g of PBS (hydroxyl group: 0.102 mol) and 10.1 g of polyethylene glycol (hydroxyl group: 0.010 mol, PEG-2000 produced by Toho Chemical Industry Co., Ltd., hydroxyl value: 57.1 mg-KOH/g) were used instead of PBS6, an amount of imine compound 1 used was changed to 12.4 g (hydroxyl group: 0.112 mol) and an amount of HDI used was changed to 18.2 g (isocyanate group: 0.214 mol) to obtain 90.5 g of polybutylene succinate-polyethylene glycol copolymer having an imine bond (referred to as "imine containing PBS-PEG" hereinafter). A molecular weight of imine containing PBS-PEG obtained was measured by GPC to give a number average molecular weight of 35,705. Its $^1$H-NMR spectrum was measured to observe a methine peak of the imine bond at 8.29 ppm to confirm the presence of the imine bond in imine containing PBS-PEG. Analytical results of the $^1$H-NMR spectrum suggest that it has a chemical structure of the following formula (16).

Imine containing PBS-PEG obtained was used to prepare a film similarly to Example 9. Tensile strength and tensile modulus of the film with a thickness of 100 μm were 25.0 MPa and 685 MPa, respectively. This film was excellent in both appearance and the sense of touch, and soft, and strong in strength.

A water solubility test was performed using a film with a thickness of 100 μm. As a result, a weight retention rate of the film was 99.5%, which confirms that this film did not have water solubility. A film with a thickness of 15 μm was also used to test the water disintegratability. As a result, a film with a 11 cm square disintegrated into a 1 to 2 cm square after 180 hours and the number average molecular weight at the time was reduced to 15,852. A film with a thickness of 30 μm was also used to test the biodegradability, resulting in a degree of biodegradability to be 17.3% after one week, 30.5% after two weeks, 45.2% after three weeks, 55.5% after four weeks and 64.2% after five weeks.

Comparative Example 6

The reaction was operated similarly to Example 15 except that imine compound 1 was not used and an amount of HDI

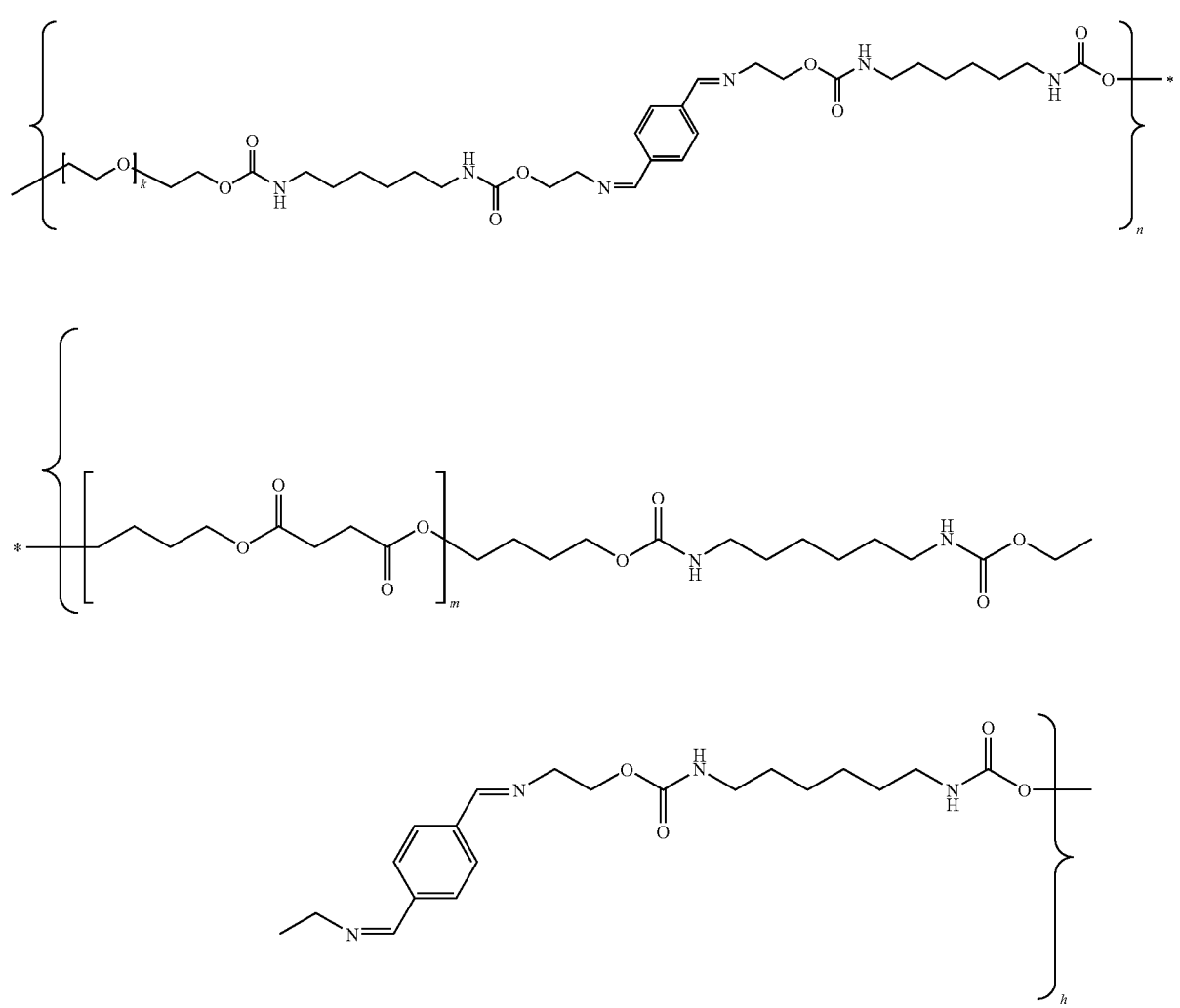

(16)

used was changed to 9.1 g (isocyanate group: 0.106 mol) to obtain 80.6 g of polybutylene succinate-polyethylene glycol copolymer (referred to as "PBS-PEG" hereinafter). A molecular weight of PBS-PEG obtained was measured by GPC to give a number average molecular weight of 42,521.

PBS-PEG obtained was used to prepare a film similarly to Example 9. Tensile strength and tensile modulus of the film with a thickness of 100 μm were 65.3 MPa and 498 MPa, respectively. This film was excellent in both appearance and the sense of touch, and soft, and strong in strength.

A water solubility test was performed using a film with a thickness of 100 μm. As a result, a weight retention rate of the film was 99.5%, which confirms that this film did not have water solubility. A film with a thickness of 15 μm was also used to test the water disintegratability, but its water disintegration was not observed. A film with a thickness of 30 μm was also used to test the biodegradability, resulting in a degree of biodegradability to be 8.7% after one week, 17.3% after two weeks, 25.8% after three weeks, 33.4% after four weeks and 45.6% after five weeks, inferior to imine containing PBS-PEG in biodegradability.

Example 16

To a 200 mL SUS separable flask equipped with a water quantification receiver with a condenser, a thermometer, a bent tube and a SUS agitation blade were added 100.0 g of PBS6 (hydroxyl group: 0.102 mol), 11.3 g of imine compound 1 (hydroxyl group: 0.102 mol), 12.3 g of diethyl carbonate (0.102 mol, produced by Wako Pure Chemical Industries, Ltd., purity: 98%) and 0.03 g of sodium methoxide (0.528 mol, produced by Wako Pure Chemical Industries, Ltd., purity: 95%). A mixture was gradually heated to 120° C., at which the reaction was continued until no ethanol formed was distilled off. The reaction was continued at 180° C. under reduced pressure for 24 hours to yield 101.3 g of polycarbonate having an imine bond (referred to as "imine containing PC" hereinafter).

A molecular weight of imine containing PC obtained was measured by GPC to give a number average molecular weight of 25,200. Its $^1$H-NMR spectrum was measured to observe a methine peak of the imine bond at 8.29 ppm to confirm the presence of the imine bond in imine containing PC. Analytical results of the $^1$H-NMR spectrum suggest that it has a chemical structure of the following formula (17).

A water solubility test was performed using a film with a thickness of 100 μm. As a result, a weight retention rate of the film was 99.5%, which confirms that this film did not have water solubility. A film with a thickness of 15 μm was also used to test the water disintegratability. As a result, a film with a 11 cm square disintegrated into a 1 to 2 cm square after 270 hours and the number average molecular weight at the time was reduced to 13,600. A film with a thickness of 30 μm was also used to test the biodegradability, resulting in a degree of biodegradability to be 40.3% after one week, 60.5% after two weeks, 75.3% after three weeks and 86.4% after four weeks.

Comparative Example 7

The reaction was operated similarly to Example 16 except that imine compound 1 was not used and an amount of diethyl carbonate used was changed to 6.2 g (0.050 mol) to obtain 90.6 g of polycarbonate (referred to as "PC" hereinafter). A molecular weight of PC obtained was measured by GPC to give a number average molecular weight of 26,528.

PC obtained was used to prepare a film similarly to Example 9. Tensile strength and tensile modulus of the film with a thickness of 100 μm were 22.0 MPa and 530 MPa, respectively. This film was excellent in both appearance and the sense of touch, and soft, and strong in strength.

A water solubility test was performed using a film with a thickness of 100 μm. As a result, a weight retention rate of the film was 99.8%, which confirms that this film did not have water solubility. A film with a thickness of 15 μm was used to test the water disintegratability, but water disintegration was not observed. A film with a thickness of 30 μm was used to test the biodegradability, resulting in a degree of biodegradability to be 21.3% after one week, 32.1% after two weeks, 40.6% after three weeks and 58.2% after four weeks, inferior to imine containing PC in biodegradability.

Example 17

The reaction was operated similarly to Example 9 except that 100.0 g of PBSA diol (hydroxyl group: 0.102 mol) was used instead of PBS6 to obtain 100.3 g of polybutylene succinate adipate having an imine bond (referred to as "imine containing PBSA" hereinafter). A molecular weight of imine containing PBSA was measured by GPC to give a number average molecular weight of 31,000. Its $^1$H-NMR spectrum

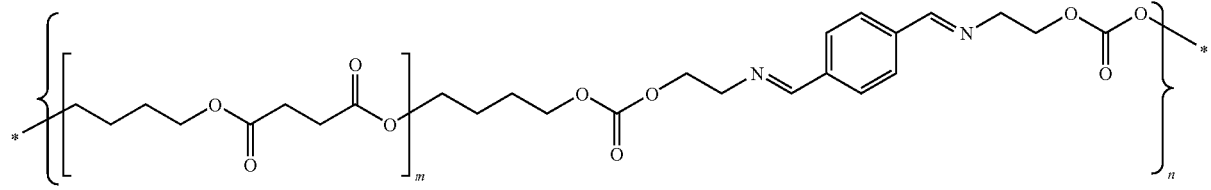

(17)

Imine containing PC obtained was used to prepare a film similarly to Example 9. Tensile strength and tensile modulus of the film with a thickness of 100 μm were 21.0 MPa and 578 MPa, respectively. This film was excellent in both appearance and the sense of touch, and soft, and strong in strength.

was measured to observe a methine peak of the imine bond at 8.29 ppm to confirm the presence of the imine bond in imine containing PBSA. Analytical results of the $^1$H-NMR spectrum suggest that it has a chemical structure of the following formula (18).

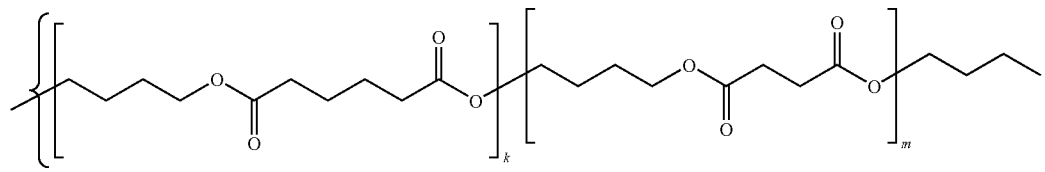

(18)

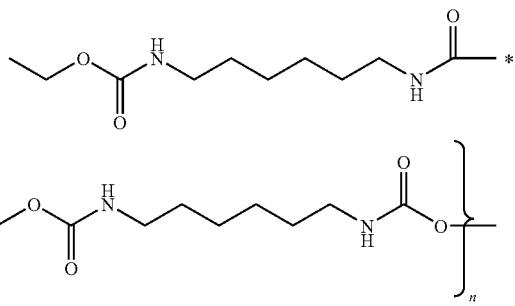

Imine containing PBSA obtained was pressed at 130° C. for minutes to prepare films with a thickness of 15 μm, 30 μm and 100 μm, respectively. Tensile strength and tensile modulus of the film with a thickness of 100 μm were 28.5 MPa and 632 MPa, respectively. This film was excellent in both appearance and the sense of touch, and soft, and strong in strength.

A water solubility test was performed using a film with a thickness of 100 μm. As a result, a weight retention rate of the film was 99.7%, which confirms that this film did not have water solubility. A film with a thickness of 15 μm was also used to test the water disintegratability. As a result, a film with a 11 cm square disintegrated into a 1 to 2 cm square after 249 hours and the number average molecular weight was reduced to 16,000. A film with a thickness of 30 μm was also used to test the biodegradability, resulting in a degree of biodegradability to be 16.8% after one week, 30.3% after two weeks, 45.0% after three weeks, 58.2% after four weeks and 66.5% after five weeks.

Example 18

The reaction was operated similarly to Example 9 except that 100.0 g of PBSA diol (hydroxyl group: 0.102 mol) was used instead of PBS6 and 15.8 g of imine compound 2 (hydroxyl group: 0.102 mol) was used instead of imine compound 1 to obtain 95.3 g of imine containing PBSA. A molecular weight of imine containing PBSA was measured by GPC to give a number average molecular weight of 30,450. Its $^1$H-NMR spectrum was measured to observe a methine peak of the imine bond at 8.29 ppm to confirm the presence of the imine bond in imine containing PBSA. Analytical results of the $^1$H-NMR spectrum suggest that it has a chemical structure of the following formula (19).

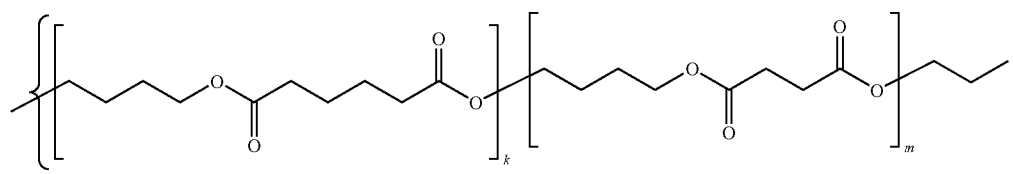

(19)

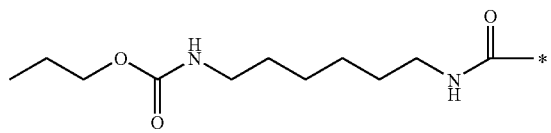

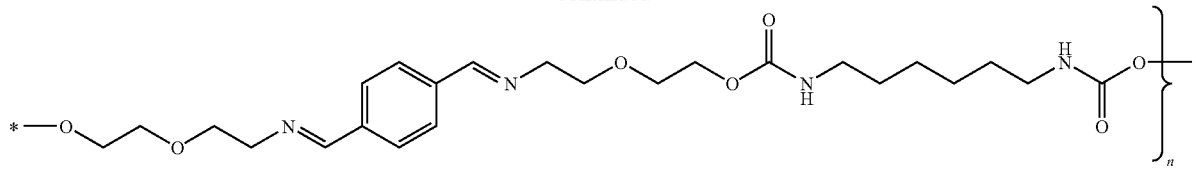

Imine containing PBSA obtained was pressed at 130° C. for minutes to prepare films with a thickness of 15 µm, 30 µm and 100 µm, respectively. Tensile strength and tensile modulus of the film with a thickness of 100 µm were 27.9 MPa and 530 MPa, respectively. This film was excellent in both appearance and the sense of touch, and soft, and strong in strength.

A water solubility test was performed using a film with a thickness of 100 µm. As a result, a weight retention rate of the film was 99.6%, which confirms that this film did not have water solubility. A film with a thickness of 15 µm was also used to test the water disintegratability. As a result, a film with a 11 cm square disintegrated into a 1 to 2 cm square after 75 hours and the number average molecular weight at the time was reduced to 15,240. A film with a thickness of 30 µm was also used to test the biodegradability, resulting in a degree of biodegradability to be 19.1% after one week, 33.5% after two weeks, 49.7% after three weeks and 63.9% after four weeks.

Comparative Example 8

The reaction was operated similarly to Example 17 except that imine compound 1 was not used and an amount of HDI used was changed to 8.2 g (isocyanate group: 0.097 mol) to obtain 80.5 g of PBSA. A molecular weight of PBSA obtained was measured by GPC to give a number average molecular weight of 24,150.

PBSA obtained was used to prepare a film similarly to Example 9. Tensile strength and tensile modulus of the film with a thickness of 100 µm were 65.2 MPa and 436 MPa, respectively. This film was excellent in both appearance and the sense of touch and soft and strong in strength.

A water solubility test was performed using a film with a thickness of 100 µm. As a result, a weight retention rate of the film was 99.8%, which confirms that this film did not have water solubility. A film with a thickness of 15 µm was used to test the water disintegratability, but its water disintegration was not observed. A film with a thickness of 30 µm was also used to test the biodegradability, resulting in a degree of biodegradability to be 5.7% after one week, 16.9% after two weeks, 25.0% after three weeks, 38.9% after four weeks and 50.8% after five weeks, inferior to imine containing PBSA in biodegradability.

Example 19

The reaction was operated similarly to Example 9 except that 8.2 g of imine compound 3 (hydroxyl group: 0.102 mol) was used instead of imine compound 1 to obtain 97.7 g of imine containing PBS. A molecular weight of imine containing PBS was measured by GPC to give a number average molecular weight of 29,544. Analytical results of the $^1$H-NMR spectrum suggest that it has a chemical structure of the following formula (20).

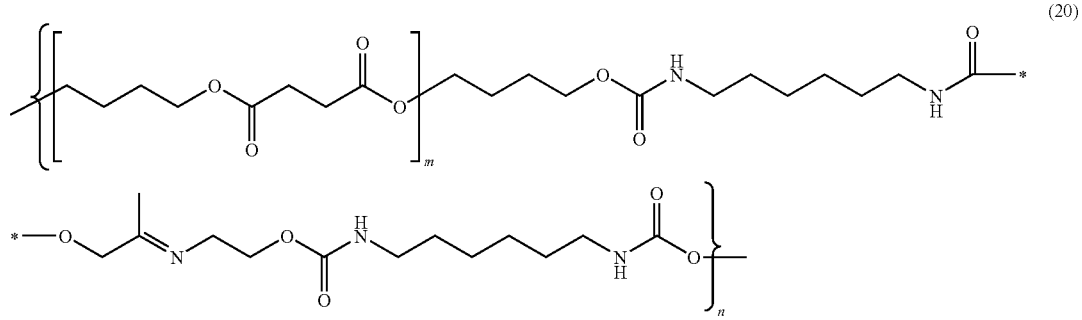

(20)

Imine containing PBS obtained was pressed at 130° C. for 5 minutes to prepare films with a thickness of 15 µm, 30 µm and 100 µm, respectively. Tensile strength and tensile modulus of the film with a thickness of 100 µm were 29.0 MPa and 577 MPa, respectively. This film was excellent in both appearance and the sense of touch, and soft, and strong in strength.

A water solubility test was performed using a film with a thickness of 100 µm. As a result, a weight retention rate of the film was 99.9%, which confirms that this film did not have water solubility. A film with a thickness of 15 µm was also used to test the water disintegratability. As a result, a film with a 11 cm square disintegrated into a 2 to 3 cm square after 433 hours and the number average molecular weight at the time was reduced to 19,421. A film with a thickness of 30 µm was also used to test the biodegradability, resulting in a degree of biodegradability to be 14.4% after one week, 25.6% after two weeks, 38.7% after three weeks, 50.8% after four weeks and 60.0% after five weeks.

Example 20

The reaction was operated similarly to Example 9 except that 11.1 g of imine compound 4 (hydroxyl group: 0.102 mol) was used instead of imine compound 1 to obtain 98.3 g of imine containing PBS. A molecular weight of imine containing PBS was measured by GPC to give a number average molecular weight of 31,000. Analytical results of the $^1$H-NMR spectrum suggest that it has a chemical structure of the following formula (21).

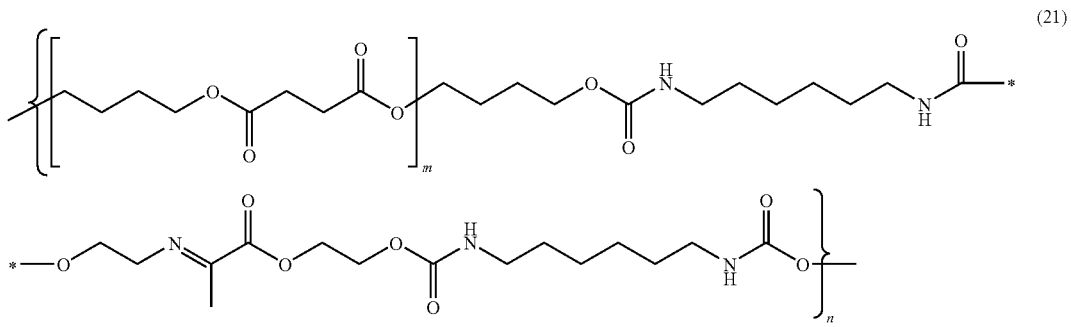

(21)

Imine containing PBS obtained was pressed at 130° C. for 5 minutes to prepare films with a thickness of 15 μm, 30 μm and 100 μm, respectively. Tensile strength and tensile modulus of the film with a thickness of 100 μm were 28.7 MPa and 598 MPa, respectively. This film was excellent in both appearance and the sense of touch, and soft, and strong in strength.

A water solubility test was performed using a film with a thickness of 100 μm. As a result, a weight retention rate of the film was 99.8%, which confirms that this film did not have water solubility. A film with a thickness of 15 μm was also used to test the water disintegratability. As a result, a film with a 11 cm square disintegrated into a 2 to 3 cm square after 445 hours and the number average molecular weight at the time was reduced to 19,540. A film with a thickness of 30 μm also was used to test the biodegradability, resulting in a degree of biodegradability to be 14.7% after one week, 25.9% after two weeks, 39.0% after three weeks, 51.4% after four weeks and 60.0% after five weeks.

Biodegradable Polymer Resin Composition

Examples 21-29 and Reference Examples 1-4

The biodegradable polymer and an inorganic additive were mixed according to the formulation condition indicated in Table 6 to melt and blend at 130° C. for 5 minutes using (LABO) PLASTOMILL. Using the discharged biodegradable polymer resin composition, a film with a thickness of 15 μm was prepared similarly to Example 9 and a water disintegration test was carried out. The time for water disintegration is shown in Table 6.

TABLE 6

| Biodegradable polymer (A) | | Inorganic additive (B) | | Weight ratio (A/B) | Time for water disintegration (hr) |
|---|---|---|---|---|---|
| Kinds | Amount (g) | Kinds | Amount (g) | | |
| Ex. 21 | Ex. 9 | 60 | Silica | 0.006 | 100/0.01 | 230 |
| Ex. 22 | Ex. 9 | 60 | Silica | 0.06 | 100/0.1 | 200 |
| Ex. 23 | Ex. 9 | 60 | Silica | 0.6 | 100/1 | 177 |
| Ex. 24 | Ex. 9 | 60 | Silica | 6 | 100/10 | 129 |
| Ex. 25 | Ex. 9 | 60 | Silica | 30 | 100/50 | 220 |
| Ref. Ex. 1 | Ex. 9 | 60 | — | 0 | 100/0 | 259 |
| Ref. Ex. 2 | Ex. 9 | 60 | Silica | 36 | 100/60 | 365 |
| Ex. 26 | Ex. 9 | 60 | Mordenite | 0.6 | 100/1 | 185 |
| Ex. 27 | Ex. 13 | 60 | Silica | 3 | 100/5 | 111 |
| Ref. Ex. 3 | Ex. 13 | 60 | — | 0 | 100/0 | 200 |

TABLE 6-continued

| Biodegradable polymer (A) | | Inorganic additive (B) | | Weight ratio (A/B) | Time for water disintegration (hr) |
|---|---|---|---|---|---|
| Kinds | Amount (g) | Kinds | Amount (g) | | |
| Ex. 28 | Ex. 14 | 60 | Silica | 6 | 100/10 | 255 |
| Ref. Ex. 4 | Ex. 14 | 60 | — | 0 | 100/0 | 520 |
| Ex. 29 | Ex. 14 | 60 | Mordenite | 6 | 100/10 | 261 |

Results in the water disintegration test indicate biodegradable polymer resin compositions, in which a range of 0.01 to 50 parts by weight of the inorganic additive was added to 100 parts by weight of the biodegradable polymer, improves the water disintegratability as compared with one without an additive. On the other hand, no improvement with the water disintegratability was observed when more than 50 parts of the inorganic additive was formulated with the biodegradable polymer resin composition.

Production of Nonwoven Fabric from Biodegradable Polymer

Examples 30-35 and Comparative Examples 9-13

Biodegradable polymers shown in Table 7 were used. The polymer was melt-spun at a spinning temperature of 210° C. using a nozzle with 72 holes. This spun filament was cooled with a stream of chilling air of 20° C. and successively taken off at a take-off rate at 3500 m/min using an air sucker to collect and deposit on a net conveyer to form a web. The web was partially thermally adhered using an emboss roll and a flat roll under a condition of a roll temperature at 105° C., an area rate of thermal press at 17% and a linear pressure of 30 kg/cm. A nonwoven fabric of the biodegradable polymer with a filament fineness of 3.0 denier and a mass per unit area of 50 g/m² was thus obtained using a spunbond method. KGSM tensile force (MD/CD) was measured as well as a water disintegration test were carried out with the nonwoven fabric obtained. The results are shown in Table 7.

TABLE 7

| | Biodegradable polymer | KGSM tensile force (MD/CD) (kg/5 cm) | Time for water disintegration (h) |
|---|---|---|---|
| Example 30 | Example 1 | 12.7/8.1 | 79 |
| Comparative Example 9 | Comparative Example 1 | 13.6/9.0 | X |

TABLE 7-continued

| | Biodegradable polymer | KGSM tensile force (MD/CD) (kg/5 cm) | Time for water disintegration (h) |
|---|---|---|---|
| Example 31 | Example 9 | 13.1/8.5 | 169 |
| Example 32 | Example 11 | 13.0/8.3 | 47 |
| Comparative Example 10 | Comparative Example 2 | 15.3/11.4 | X |
| Example 33 | Example 13 | 12.3/7.8 | 115 |
| Comparative Example 11 | Comparative Example 4 | 15.4/11.6 | X |
| Example 34 | Example 15 | 12.8/8.3 | 92 |
| Comparative Example 12 | Comparative Example 6 | 14.9/11.0 | X |
| Example 35 | Example 16 | 12.4/8.0 | 171 |
| Comparative Example 13 | Comparative Example 7 | 12.2/7.6 | X |

Note:
X: No water disintegration after 520 hours.

Nonwoven fabrics produced by the biodegradable polymer of the invention (Examples 30-35) had good appearance, good sense of touch, flexibility and sufficient strength. They also demonstrated excellent water disintegratability. On the other hand, nonwoven fabrics produced by the biodegradable polymer having no imine bond (Comparative Examples 9-13) was good with appearance, the sense of touch and strength, but demonstrated no water disintegratability.

The invention claimed is:

1. A production method of a biodegradable polymer, wherein a compound comprising a biodegradable unit, a compound comprising an imine unit having one or more imine bonds, and a linking agent are allowed to react to form the biodegradable polymer which comprises a biodegradable unit and an imine unit having one or more imine bonds within a molecule, wherein the imine bond constitutes part of a main chain structure of the biodegradable polymer and wherein the biodegradable polymer has a chemical structure in a form in which the biodegradable units are linked via the imine unit.

2. The production method of the biodegradable polymer according to claim 1, wherein the linking agent is a diisocyanate or a carbonate ester.

* * * * *